(12) United States Patent
Huang et al.

(10) Patent No.: US 12,314,837 B2
(45) Date of Patent: *May 27, 2025

(54) MULTI-MEMORY ON-CHIP COMPUTATIONAL NETWORK

(71) Applicant: Amazon Technologies, Inc., Seattle, WA (US)

(72) Inventors: Randy Huang, Morgan Hill, CA (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,954

(22) Filed: Jun. 22, 2023

(65) Prior Publication Data
US 2023/0334294 A1 Oct. 19, 2023

Related U.S. Application Data

(60) Division of application No. 17/033,573, filed on Sep. 25, 2020, now Pat. No. 11,741,345, which is a
(Continued)

(51) Int. Cl.
*G06N 3/045* (2023.01)
*G06F 3/06* (2006.01)
(Continued)

(52) U.S. Cl.
CPC .............. *G06N 3/045* (2023.01); *G06F 3/061* (2013.01); *G06F 3/065* (2013.01); *G06F 3/0683* (2013.01);
(Continued)

(58) Field of Classification Search
CPC ........ G06N 3/063; G06N 3/08; G06N 3/0454; G06N 3/044; G06F 3/061; G06F 3/065;
(Continued)

(56) References Cited

U.S. PATENT DOCUMENTS 5,422,983 A 6/1995 Castelaz et al.
9,971,540 B2 5/2018 Herrero et al.
(Continued)

FOREIGN PATENT DOCUMENTS

CN 106462803 A 2/2017
CN 107454965 A 12/2017
(Continued)

OTHER PUBLICATIONS

CN Notice of Allowance dated Aug. 29, 2023 in Application No. CN201880080107.8 with English translation.
(Continued)

*Primary Examiner* — Tan V Mai
(74) *Attorney, Agent, or Firm* — Weaver Austin Villeneuve & Sampson LLP

(57) ABSTRACT

Provided are systems, methods, and integrated circuits for neural network processing. In various implementations, an integrated circuit for neural network processing can include a plurality of memory banks storing weight values for a neural network. The memory banks can be on the same chip as an array of processing engines. Upon receiving input data, the circuit can be configured to use the set of weight values to perform a task defined for the neural network. Performing the task can include reading weight values from the memory banks, inputting the weight values into the array of processing engines, and computing a result using the array of processing engines, where the result corresponds to an outcome of performing the task.

20 Claims, 18 Drawing Sheets

Related U.S. Application Data continuation of application No. 15/839,301, filed on Dec. 12, 2017, now Pat. No. 10,803,379.

(51) Int. Cl.
  *G06F 13/28* (2006.01)
  *G06F 13/40* (2006.01)
  *G06F 15/80* (2006.01)
(52) U.S. Cl.
  CPC .......... *G06F 13/28* (2013.01); *G06F 13/4068* (2013.01); *G06F 15/80* (2013.01)
(58) Field of Classification Search
  CPC .... G06F 3/0683; G06F 13/28; G06F 13/4068; G06F 15/80
  USPC .......................................................... 706/16
  See application file for complete search history.

(56) References Cited

U.S. PATENT DOCUMENTS

| | | |
|---|---|---|
| 10,096,134 B2 | 10/2018 | Yan et al. |
| 10,332,028 B2 | 6/2019 | Talathi et al. |
| 10,504,022 B2 | 12/2019 | Temam et al. |
| 10,803,379 B2 | 10/2020 | Huang et al. |
| 10,846,621 B2 | 11/2020 | Huang et al. |
| 11,741,345 B2 | 8/2023 | Huang et al. |
| 2007/0094481 A1 | 4/2007 | Snook et al. |
| 2014/0310217 A1 | 10/2014 | Sarah et al. |
| 2015/0206050 A1 | 7/2015 | Talathi et al. |
| 2015/0242741 A1 | 8/2015 | Campos et al. |
| 2015/0331832 A1 | 11/2015 | Minoya et al. |
| 2016/0071005 A1 | 3/2016 | Wang et al. |
| 2016/0179434 A1 | 6/2016 | Herrero Abellanas et al. |
| 2016/0342891 A1 | 11/2016 | Ross et al. |
| 2017/0061326 A1 | 3/2017 | Talathi et al. |
| 2017/0286825 A1 | 10/2017 | Akopyan et al. |
| 2019/0180183 A1 | 6/2019 | Diamant et al. |
| 2019/0243764 A1 | 8/2019 | Sakthivel et al. |

FOREIGN PATENT DOCUMENTS

| | | |
|---|---|---|
| CN | 107454966 A | 12/2017 |
| JP | H04293151 A | 10/1992 |
| JP | 2002049405 A | 2/2002 |
| JP | 2002117389 A | 4/2002 |
| JP | 2013529342 A | 7/2013 |
| JP | 2013178294 A | 9/2013 |
| JP | 2015215837 A | 12/2015 |
| WO | WO-2011146147 A1 | 11/2011 |
| WO | WO-2016186810 A1 | 11/2016 |

OTHER PUBLICATIONS

CN Office Action dated Feb. 15, 2023 in Application No. CN201880080107.8 with English translation.
Communication under Rules 161(1) and 162 EPC dated Jul. 21, 2020 in Application No. EP 18836949.0.
EP Office Action dated Jul. 5, 2022, in Application No. EP18836949.0.
Final Office Action dated Apr. 1, 2022 in Application No. JP 2020-531932.
Galindo Sanchez, F., "Energy proportional streaming spiking neural network in a reconfigurable system," Accepted Author Manuscript (AAM), University of Bristol, 2017, 20 pages. URL: https://research-information.bris.ac.uk/en/publications/energy-proportional-streaming-spiking-neural-network-in-a-reconfi.
Gill, "Everything You Always Wanted to Know About SDRAM (Memory): But Were Afraid to Ask", AnandTech, Available Online at: https://www.anandtech.com/show/3851/everything-you-always-wanted-to-know-about-sdram-memory-but-were-afraid-to-ask/2, Aug. 15, 2010, 5 pages.
International Search Report and Written Opinion, mailed Apr. 1, 2019 in PCT/US2018/064777.
Jouppi, N. P., et al., "In-Datacenter Performance Analysis of a Tensor Processing Unit," To appear at the 44th International Symposium on Computer Architecture (ISCA), Toronto, Canada, Jun. 26, 2017, 17 pages.
Liao et al., "Machine Learning-Based Prefetch Optimization for Data Center Applications", IEEE Xplore, Nov. 14-20, 2009, 10 pages.
Machine translation of Ye, Y., et al., "Design of Non-Volatile Synapse Array and Neuron Circuits," Microelectronics & Computer, Nov. 2017, vol. 34(11), 5 pages.
Notice of Allowance dated Oct. 21, 2022, in Application No. JP 2020-531932.
Nurvitadhi et al., "Can FPGAs Beat GPUS in Accelerating Next-Generation Deep Neural Networks?", in FPGA '17, ACM Digital Library, Available Online at: https://dl.acm.org/doi/pdf/10.1145/3020078.3021740, Feb. 22-24, 2017, pp. 5-14.
Office Action dated Aug. 4, 2021; JP 2020531932.
Peemen et al., "Memory-Centric Accelerator Design For Convolutional Neural Networks", IEEE Xplore, Available Online at: https://ieeexplore.ieee.org/document/6657019, 2013, 7 pages.
Reineke et al., "Timing Predictability of Cache Replacement Policies", Real Time Systems, vol. 37, No. 2, Nov. 2007, pp. 1-24.
Sze, V., et al., "Efficient Processing of Deep Neural Networks: A Tutorial and Survey," Aug. 13, 2017, 32 pages.
U.S. Restriction Requirement dated Sep. 7, 2022 in U.S. Appl. No. 17/033,573.
U.S. Non-Final office Action dated Dec. 30, 2022 in U.S. Appl. No. 17/033,573.
U.S. Non-Final Office Action dated Jun. 24, 2020 in U.S. Appl. No. 15/839,017.
U.S. Non-Final office Action dated May 22, 2020, in U.S. Appl. No. 15/839,157.
U.S. Notice of Allowance dated Apr. 6, 2023 in U.S. Appl. No. 17/033,573.
U.S. Corrected Notice of Allowability dated Apr. 24, 2023 in U.S. Appl. No. 17/033,573.
U.S. Notice of Allowance dated Jul. 17, 2020, in U.S. Appl. No. 15/839,157.
U.S. Notice of Allowance dated Jun. 17, 2020, in U.S. Appl. No. 15/839,301.
Ye, Y., "Design of Non-Volatile Synapse Array and Neuron Circuits," Microelectronics & Computer, Nov. 2017, vol. 34 (11), pp. 1-5.
JP Office Action dated Oct. 6, 2023 in JP Application No. 2022-123015 with English Translation.
EP Office Action dated Feb. 8, 2024 in EP Application No. 18836949.0.
EP Notice of Allowance dated Aug. 27, 2024 in EP Application No. 18836949.0.
JP Notice of Allowance dated Feb. 9, 2024 in JP Application No. 2022-123015 with English Translation.

MULTI-MEMORY ON-CHIP COMPUTATIONAL NETWORK

CROSS-REFERENCE TO RELATED APPLICATIONS

This application is a division of U.S. patent application Ser. No. 17/033,573, filed Sep. 25, 2020, issued as U.S. Pat. No. 11,741,345 on Aug. 29, 2023 and entitled "MULTI-MEMORY ON-CHIP COMPUTATIONAL NETWORK," which is a continuation of U.S. patent application Ser. No. 15/839,301, filed Dec. 12, 2017, issued as U.S. Pat. No. 10,803,379 on Oct. 13, 2020, and entitled "MULTI-MEMORY ON-CHIP COMPUTATIONAL NETWORK," which is related to and incorporates by reference for all purposes the full disclosures of U.S. patent application Ser. No. 15/839,157, filed Dec. 12, 2017, issued as U.S. Pat. No. 10,846,621 on Nov. 24, 2020, and entitled "FAST CONTEXT SWITCHING FOR NEURAL NETWORKS" and U.S. patent application Ser. No. 15/839,017, filed Dec. 12, 2017, entitled "ON-CHIP COMPUTATIONAL NETWORK," the contents of which are herein incorporated in their entireties.

BACKGROUND

Neural networks attempt to replicate, using computer technology, logical reasoning performed by the biological neural networks that constitute animal brains. Neural networks take inspiration from the mechanics of the operation of the human brain. In a neural network, neurons are represented by nodes and synapses are represented by weighted connections between the nodes. The weights can reflect different responses to input. A neural network can be arranged in layers, where input data to be analyzed is provided to an input layer, and the outputs of each layer provide the inputs to the next layer. The last layer can output a result. The weight values can be determined through training, during which input data with a known result is provided to the neural network.

Neural networks can be implemented using a Central Processing Unit (CPU) to perform the computations. CPUs, however, tend to be optimized for sequential rather than parallel computations, and thus can suffer from poor response times. Graphics Processing Units (GPUs) are optimized for parallel computations, but not necessarily for the result from one computation unit to be provided directly to another computation unit. Often, the result must first be written to a memory. GPUs, though having better response times than CPUs, may nevertheless lag in response times.

Special-purpose neural network processors include computation arrays optimized for parallel, chained computations. In a neural network processor, computation units can output a result directly into another computation unit, without needing to write the result to memory. When the result does need to be written to memory, for example to start a new cycle of computations through the array, the result can be stored in a memory that is local to the computation array. Neural network processors can thus perform better than both CPUs and GPUs on the same input data.

BRIEF DESCRIPTION OF THE DRAWINGS

Various examples will be described with reference to the drawings, in which.

DETAILED DESCRIPTION

Figure 1:
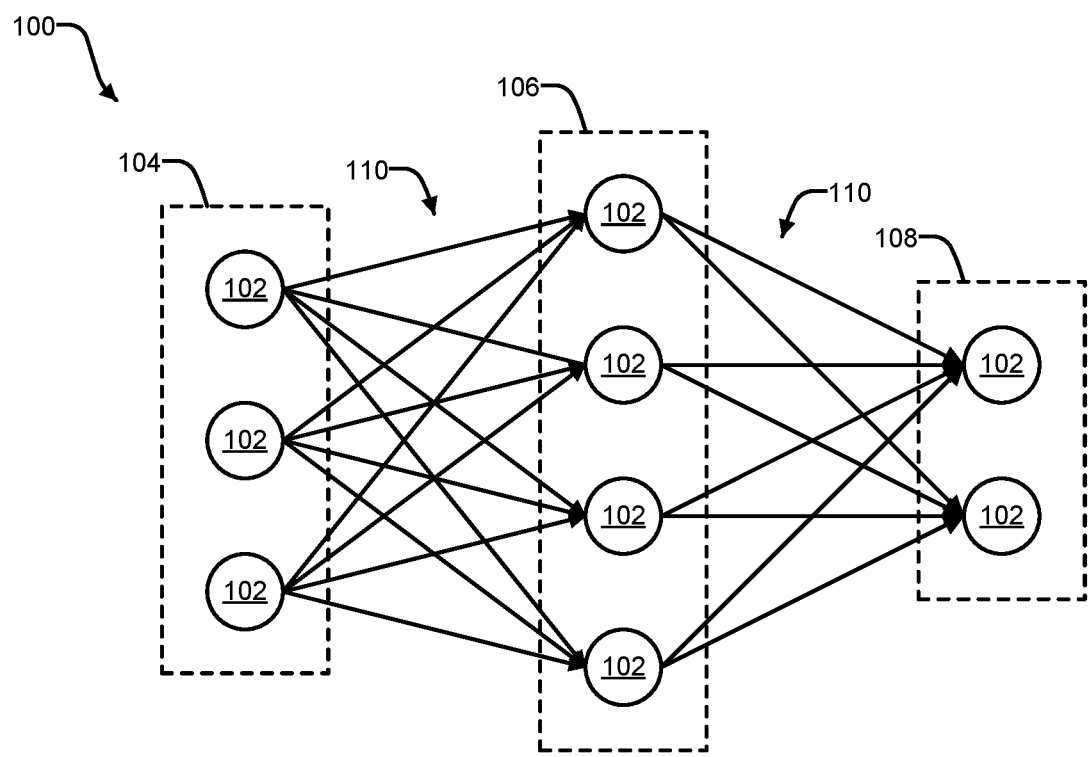
FIG. 1 illustrates an example of visual model for a neural network.

In the following description, various example implementations will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Artificial neural networks attempt to replicate, using computer technology, logical reasoning performed by the biological neural networks that constitute animal brains. Artificial neural networks (which will be referred to herein as neural networks) are part of the field of artificial intelligence (AI), an area of research and engineering seeking to build intelligent machines that can make decisions in the same way that humans do. Neural networks fall within a sub-field of artificial intelligence called machine learning. Machine learning is a field of study that investigates giving computers the ability to learn without being explicitly programmed. A program that implements a machine learning algorithm is able to learn to do tasks without the program needing to include code that accounts for every possibility, and code that describes all possible behaviors.

Neural networks take inspiration from the mechanics of the operation of the human brain, to the extent that these operations are understood. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

FIG. 1 illustrates an example of a visual model 100 for a neural network. In this example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, $x_i$ is an input activation, $y_j$ is an output activation, $f()$ is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

A neural network that has more than three layers (e.g., more than one hidden layer) is sometimes referred to as a deep neural network. Deep neural networks can have, for example, five to more than a thousand layers.

Neural networks with many layers can be capable of learning high-level features with more complexity and abstraction than shallower networks. As an example, a neural network can be taught to recognize images. In this example, pixels of an image can be fed into the input layer of the neural network, and the outputs of the first layer can indicate the presences of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, the probability that an audio sequence contains a particular word, a bounding box in an image around an object, or a proposed action that should be taken. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Neural networks have been used for a variety of applications, including, for example, in the areas of image and video, speech and language, medicine, game play, and robotics. In image and video, neural networks have been used for image classification, object localization and detection, image segmentation, and action recognition. In speech and language, neural networks have been used for speech recognition, machine translation, natural language processing, and audio generation. In the medical field, neural networks have been used in genomics and medical imaging. In game play, neural networks have been used to play video and board games, including games with immense numbers of possible moves such as Go. In robotics, neural networks have been used for motion planning of a robot, visual navigation, control stabilization, and driving strategies for autonomous vehicles.

Figure 2A:
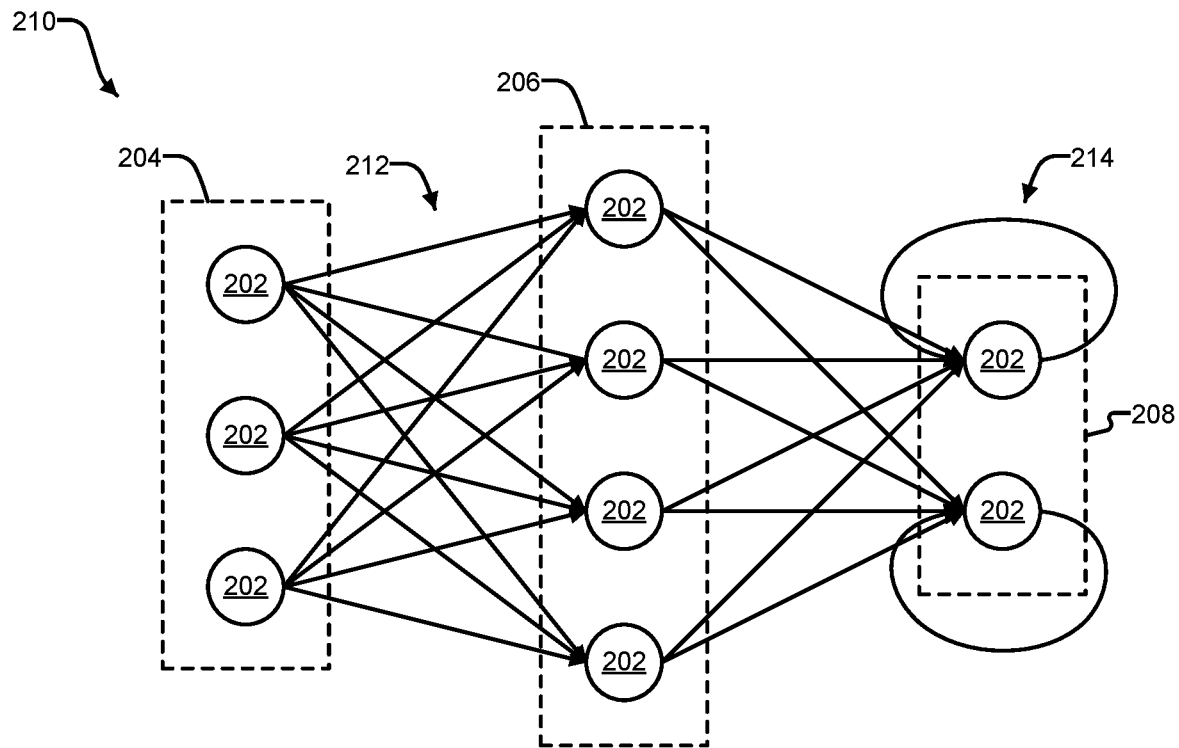
FIG. 2A illustrates an example of a model for a neural network that includes feed-forward weights and recurrent weights.

Different varieties of neural networks have been developed. Various examples of neural networks can be divided into two forms: feed-forward and recurrent. FIG. 2A illustrates an example of a model 210 for a neural network that includes feed-forward weights 212 between an input layer 204 and a hidden layer 206, and recurrent weights 214 at the output layer 208. In a feed-forward neural network, the computation is a sequence of operations on the outputs of a previous layer, with the final layer generating the outputs of the neural network. In the example illustrated in FIG. 2A, feed-forward is illustrated by the hidden layer 206, whose nodes 202 operate only the outputs of the nodes 202 in the input layer 204. A feed-forward neural network has no memory and the output for a given input can be always the same, irrespective of any previous inputs given to the neural network. The Multi-Layer Perceptron (MLP) is one type of neural network that has only feed-forward weights.

In contrast, recurrent neural networks have an internal memory that can allow dependencies to affect the output. In a recurrent neural network, some intermediate operations can generate values that are stored internally and can be used as inputs to other operations, in conjunction with the processing of later input. In the example of FIG. 2A, recurrence is illustrated by the output layer 208, where the outputs of the nodes 202 of the output layer 208 are connected back to the inputs of the nodes 202 of the output layer 208. These looped-back connections can be referred to as recurrent weights 214. Long Short-Term Memory (LSTM) is a frequently used recurrent neural network variant.

Figure 2B:
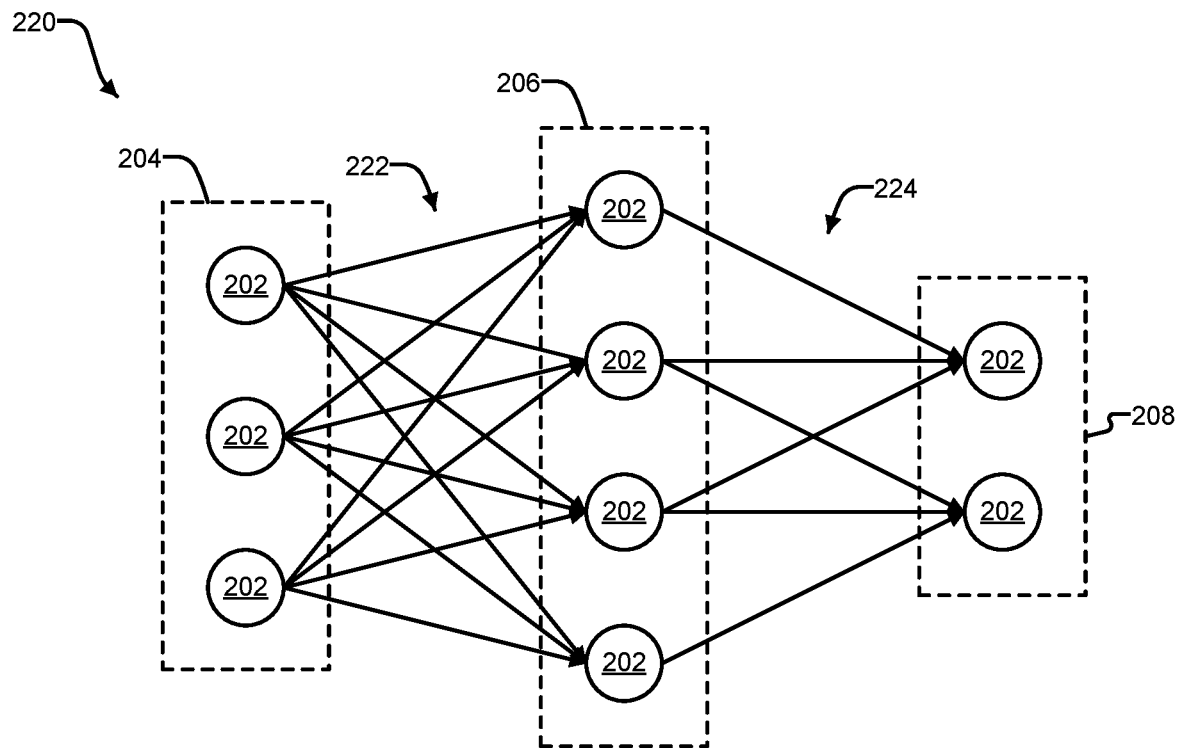
FIG. 2B illustrates an example of a model for a neural network that includes different connection types.

FIG. 2B illustrates an example of a model 220 for a neural network that includes different connection types. In this example model 220, the input layer 204 and the hidden layer 206 are fully connected 222 layers. In a fully connected layer, all output activations are composed of the weighted input activations (e.g., the outputs of all the nodes 202 in the input layer 204 are connect to all of the inputs of the hidden layer 206). Fully connected layers can require a significant amount of storage and computations. Multi-Layer Perceptron neural networks are one type of neural network that is fully connected.

In some applications, some connections between the activations can be removed, for example by setting the weights for these connections to zero, without affecting the accuracy of the output. The result is sparsely connected 224 layers, illustrated in FIG. 2B by the weighs between the hidden layer 206 and the output layer 208. Pooling is another example of a method that can achieve sparsely connected 224 layers. In pooling, the outputs of a cluster of nodes can be combined, for example by finding a maximum value, minimum value, mean value, or median value.

The efficiency of operating a neural network can be further improved in several different ways. For example, the number of weights that contribute to an output can be limited by having the output be a function of only a fixed-sized window of inputs. Even further efficiency can be gained when the same set of weights are used in the calculation of every output. Repeated use of the same weight values is referred to as weight sharing, and can significantly reduce the storage requirements for weights.

Figure 3A:
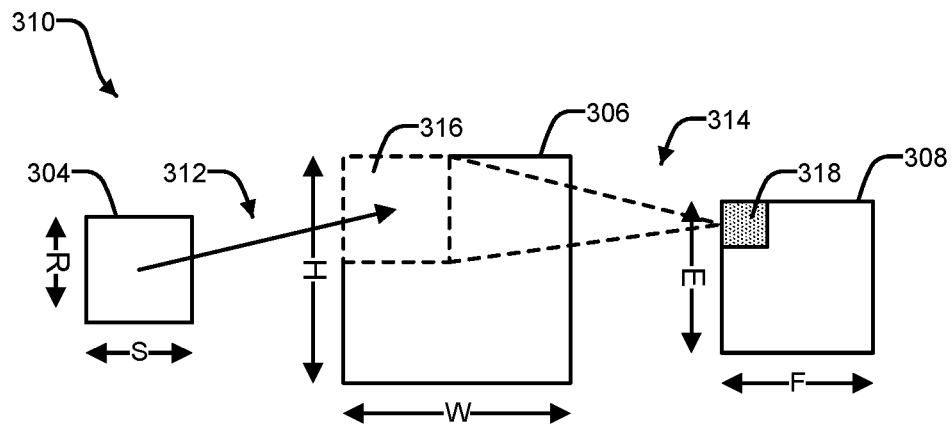
FIG. 3A illustrates an example of a model of a 2-dimensional convolution.

Windowing and weight sharing in a neural network layer can be accomplished by structuring the computation executed at each node as a convolution. FIG. 3A illustrates an example of a model 310 of a 2-dimensional convolution as applied to image processing. In this example model, a filter plane 304 is a set of weights arranged in a matrix having a height R and a width S. The filter plane 304 can be applied—using, for example, an element-wise multiplication 312—to an input image, whose data can be referred to as an input feature map 306. The height R and width S of the filter plane 304 are both less than the height H and width W of the input feature map 306, thus application of the filter plane 304 to the input feature map 306 results in a small neighborhood of input activations 316 being computed (e.g., weights beyond the neighborhood can be set to zero). The input activations 316 can be combined using, for example, a partial sum accumulation 314 to produce an output activation 318 in an output feature map 308. The output feature map 308 represents a higher-level abstraction of the input feature map 306, and has a height E and a width F. In this model 310, the same set of weights can be shared for every output (e.g., the filter space is invariant).

Figure 3B:
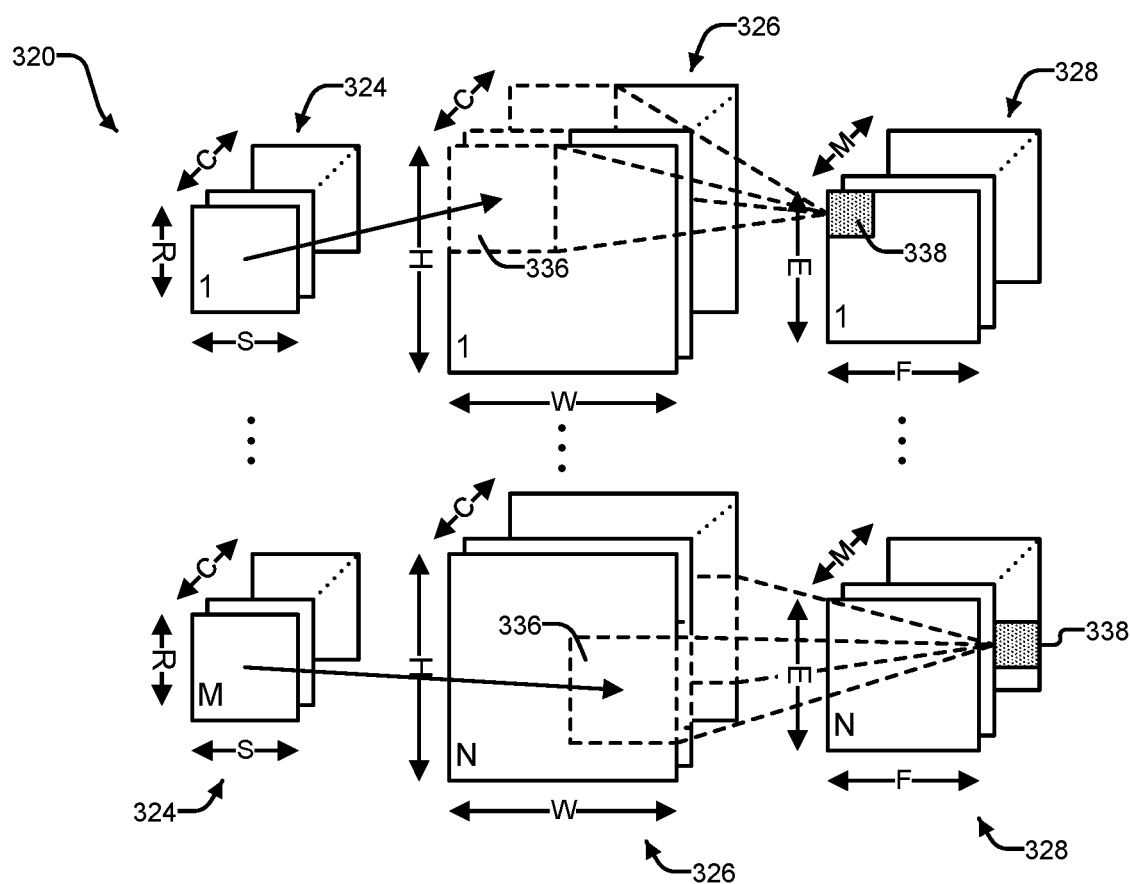
FIG. 3B illustrates an example of a model for convolutional neural network.

FIG. 3B illustrates an example of a model 320 for convolutional neural network, as applied to image processing. A convolutional neural network can include multiple convolution layers. In a convolutional neural network, each layer can generate a successively higher level abstraction of the input data (that is, of, an input feature map 326). A convolutional neural network can achieve very good performance by employing a deep hierarchy of layers.

As illustrated by the example of FIG. 3B, each convolution layer in a convolutional neural network is composed of a high-dimensional convolution. In this model 320, the input activations 336 of a layer are structured as a set of 2-dimensional input feature maps 326, each of which is referred to as a channel, C. Each channel is convolved with a particular 2-dimensional filter from a stack of filters 324, which has a filter for each channel. The stack of filters 324 can be referred to as a single 3-dimensional filter. The results of the convolution of each point are summed across all channels to produce output activations 338 that together form one channel, M, of output feature map 328. Additional 3-dimensional filters, M, corresponding to the number of output channels, can be used on the same input to generate additional output channels. To improve reuse of filter weights, multiple input feature maps 326, labeled 1 through N in the illustrated example, can be batch processed.

Convolutional neural networks can include between five and more than a thousand layers. In some examples, a small number, such as between one and three, of fully connected layers can be applied after the convolutional layers, for classification purposes. A fully connected layer can also apply filters to input feature maps, but the filters are the same size as the input feature maps. A fully connected layer thus does not have the weight sharing property of a convolutional layer.

Training of a neural network can occur online, that is, when the neural network is in operation and available to users. More often, however, training occurs offline and before the neural network is put into operation. Training sample sets can be quite large, and thus training can require hours or days. Offline training can potentially also produce more accurate results.

Once trained, a neural network includes the weights determined during the training and a set of instructions describing the computation to be executed at each layer or node of the network. In some examples, the number of weights can be on the order of 5 million to 100 million. In some examples, a weight value can be represented using a 32-bit number, in which case 5 million to 100 million weights can require about 20 megabytes (MB) to 400 MB to store. In some examples, the number of weights can be as few as 1.5 million.

Operation of a neural network (e.g., conducting inference), as illustrated by the models discussed above, involves fetching input data or input activations, executing multiply-and-accumulate operations in parallel for each node in a layer, and providing output activations. Optimum performance of a neural network, measured by response time, can be achieved when a hardware architecture is capable of highly parallelized computations. Central Processing Units (CPUs), which can also be referred to as general purposed processing units, can have multiple cores, (e.g., 2 to 64 or more cores) and can increase parallelism through use of multiple execution threads. CPU cores, however, tend to be optimized for sequential processing. For example, a computation engine (e.g., an arithmetic logic unit (ALU)) of a core obtains operands from memory and writes a result to memory, such that memory operations are required for sequential computations. In this example, each memory operation can require management by control logic of the CPU. For this and other reasons, CPUs thus tend to have slow response times when performing inference for a neural network.

In contrast to CPUs, Graphics Processing Units (GPUs) achieve parallelism by having thousands of small and efficient cores, configured specifically for conducting parallel computations. GPUs thus can achieve far better performance than a CPU when executing a neural network. Individual GPU computation engines, however, can still be primarily sequential in nature, such that memory operations are required for the outputs of one computation engine to be provided to the inputs of another.

When executing a neural network, the performance bottleneck that can be encountered by both CPUs and GPUs is in accessing memory. A multiply-and-accumulate operation can require three memory reads, one each to fetch a weight value, an input feature map activation, and a partial sum, and a memory write to store an updated partial sum. In the worst case, all memory transactions go to off-chip memory, that is, a memory that is located on a different die and in a different package from the processor. This memory, which can be referred to as processor memory or main memory, can be dedicated to the processor for temporary storage of data that is actively being operated on by the processor. Dynamic Random Access Memory (DRAM) or DRAM variants are frequently used for processor memory, due to having high capacity and low cost. Reading from and writing to processor memory, however, is many orders of magnitude slower than the operation of the computation engine. The speed of a neural network can thus be limited by off-chip memory latency.

Special-purpose neural network processors can achieve better performance than both CPUs and GPUs when executing a neural network. Neural network processors can employ a spatial architecture, in which computation engines form processing chains and can pass data directly from one computation engine to another. This can significantly reduce the number of memory transactions. In some examples, neural network processors can also include an on-chip buffer that can store values read from processor memory, and that can distribute values to multiple computation engines in the processor. The computation engines can further include a small, local register file (e.g., a small memory) for storing intermediate results. Having an on-chip memory hierarchy can improve the efficiency of the operation of a neural network by reducing memory latencies.

Neural network processors can nevertheless become memory bandwidth limited when the weight values for a neural network are stored off-chip. The speed at which a computation matrix of a neural network processor can execute computations can quickly exceed the rate at which weight values and activations can be read from memory. For example, a computation matrix can perform 10,000 multiply-and-accumulate operations per clock cycle, thus requiring 30,000 input values per cycle. The clock speed of processor memory busses can be in the range of, for example thousands of megahertz (MHz) while the clock speed for processors can be in the multiples of gigahertz (GHz). The computation rate of a neural network processor can thus quickly outpace the ability of processor memory to supply data.

Reuse of weight values is one way in which memory bandwidth limitations can be circumvented. Reuse is common in convolution neural networks, where a weight value can be reused, for example, 1300 times on average. As discussed further below, neural networks with frequent reuse of weight values can potentially avoid the memory bandwidth limitation, and can instead be limited by the computation speed of the processor.

In Long Short-Term Memory neural networks and Multi-Layer Perceptron neural networks, the reuse factor of weight values is much lower, such as, for example, two times on average.

One solution used to increase weight value reuse is batching. Batching involves inputting more than one set of input data into a neural network at a time. The sets of input data need not be related. With batching, when the neural network is provided with, for example, ten sets of input data, each weight can be reused twenty times (e.g., twice per set of input data) after having been read once from memory.

Mathematical models suggest, however, that a high reuse factor is needed for a neural network processor to achieve maximum possible performance. For example, some examples suggest that a reuse factor of about 1000 is needed. When batching, it may be possible to collect, for example, 50 to 60 sets of input data at a time, but collecting 500 sets of input data may lead to other problems. For example, users of a neural network expect immediate responses when requesting, for example, a machine translation or image identification. When a neural network processing system waits to have 500 requests before the system begins calculating results, response time can be negatively impacted.

In various implementations, a neural network processing system can reduce memory bandwidth limitations and can approach optimal efficiency by storing the weights for a neural network in on-chip memory. On-chip means that the memory is on the same die and/or in the same package (e.g., the physical enclosure for the die) as the computation matrix. Neural network processors can have on-chip memory for storing intermediate results. In various implementations, the memory subsystem of the processor can be designed such that the on-chip memory can store both intermediate results and weight values. The neural network processor may still be memory bound, but it may be possible to read the on-chip memory as much as, for example, ten or fifty times faster than off-chip memory. Reducing memory delays by this amount may enable operation of a neural network to approach the computation speed limit of the processor.

In some cases, particularly for small neural networks, it may be possible for all of the weight values for the neural network to be stored in on-chip memory. Using a single monolithic memory, however, may still lead to memory delays because the single memory may have only for example, one or two sets of read and write channels, such that only one or two values can be read at a time. In various implementations, instead of one large memory, a neural network processor can be equipped with multiple memory banks, which can each be individually accessible. By being independently accessible, it may be possible to read more than one memory bank at the same time.

In a neural network processing engine, the computation matrix can be implemented as an array of processing engines. The neural network processing engine can further include a set of memory banks local to the array of processing engines, where local can mean physically close to and/or directly accessible by the array of processing engines. As noted above, the local memory banks can be used by the neural network processing engine to store intermediate results. In some cases, particularly when the neural network is small, all of the weight values for the neural network can also be stored in the memory banks of the neural network processing engine. In these cases, it may be possible for the array of processing engines to sustain full utilization in every clock cycle.

In some examples, not all of the weight values for a neural network can fit in the memory banks of a neural network processing engine. For example, the memory banks may have sufficient space for half of the weight values, with any remaining space being needed for storing intermediate results computed during the course of processing a set of input data. The size of the intermediate results, however, can decrease over the course of computing a result. Additionally, once used, some weight values may no longer be needed. Thus, in some implementations, as a computation progresses and memory space becomes available, the neural network processing engine can load additional weights into the available space. In some cases, the weights can come from an off-chip memory. In some cases, the weights can come from on-chip memory, for example the memory banks of another neural network processing engine.

In some implementations, a neural network processor can be constructed with multiple neural network processing engines, each having an independent array of processing engines and local memory banks. In these implementations, each neural network processing engine can execute a neural network, so that multiple neural networks can be run at the same time. In some implementations, the weight values for one neural network can be stored in the memory banks of two or more neural network processing engines, with one designated as being the engine for processing the neural network. When the designated neural network processing engine needs the weights that are stored with another neural network processing engine, the weights can be read from the memory banks of the other neural network processing and loaded into the memory banks of the designated neural network processing engine. The other neural network processing engine can use any remaining available space in its own memory banks for other operations.

In some implementations, instead of moving weights from one neural network processor to another, the computation can be moved. For example, an intermediate result (e.g., the output activations from a layer) and a state (e.g., the last layer that was computed) can be copied from one neural network processing engine to a second neural network processing engine, where the second neural network processing engine has in its memory banks the next set of weight values needed to continue the computation. The second neural network processing engine can resume the computation, and possibly hand the computation off to yet another neural network processing engine.

The transfer of an in-progress computation from one neural network processing engine to another can, in some implementations, include transferring between individual neural network processors. In these implementations, the individual neural network processors can be on different dies and/or in different packages. Also in this example, the neural network processor can communicate using a host bus or processor bus. As when the neural network processing engines are on the same die, copying an intermediate result and state can move the computation from one neural network processor to another.

In various implementations, copying weights from one neural network processing engine to another, moving an in-progress computation between neural network processing engines and/or between physical neural network processor chips can be used in various combinations, with the goal being to store as many of the weight values for a neural network on-chip as is possible. By having the weight values on chip, the computations may be limited only by the relatively short on-chip memory latency, instead of being limited by the relatively long off-chip memory latency. As a result, operation of a neural network can be made much more efficient.

Figure 4:
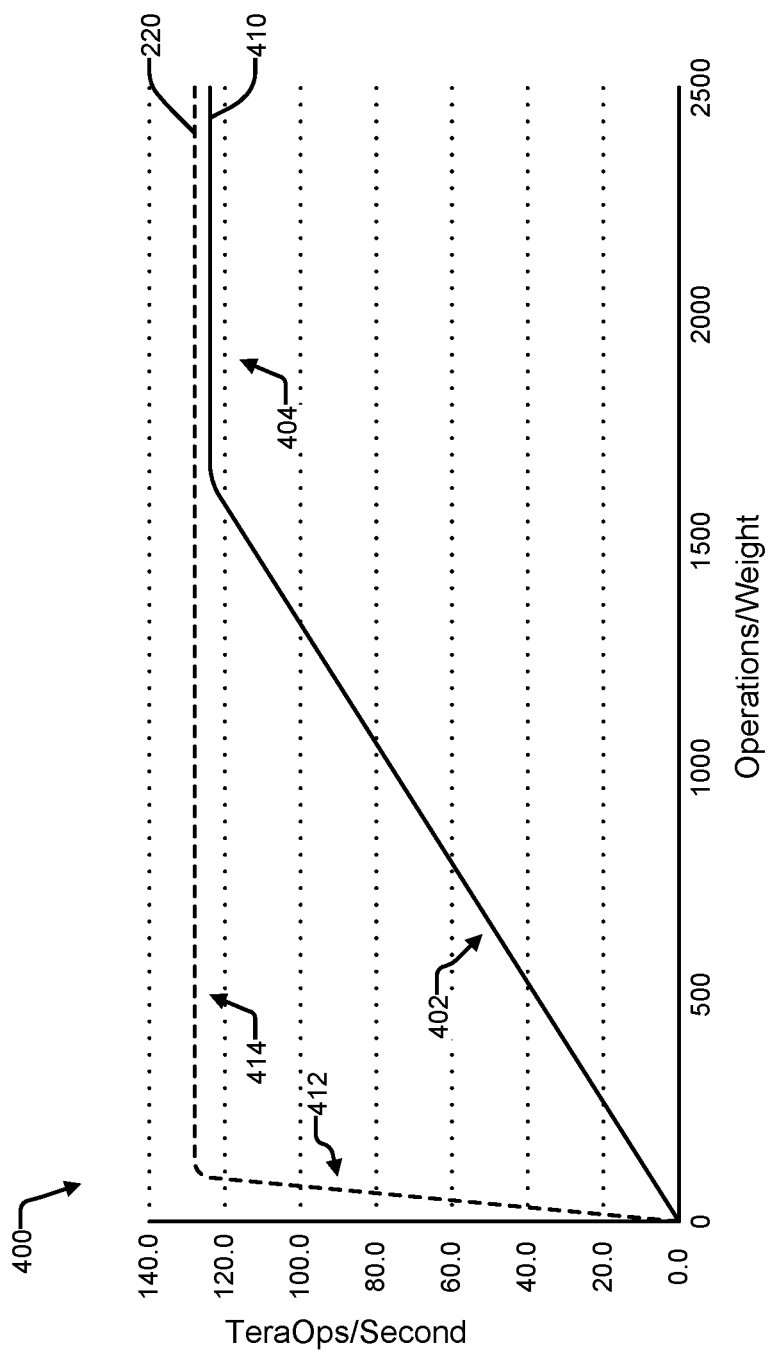
FIG. 4 illustrates an example of the effect of storing the weight values for a neural network on-chip instead of in off-chip memory.

FIG. 4 illustrates an example of the effect of storing the weight values for a neural network on-chip instead of in off-chip memory. The graph 400 illustrated in FIG. 4 illustrates an application of what is referred to as the roofline model. A roofline model is a performance model that can be used to provide estimates of the performance of a computing system. The roofline model can capture inherent hardware limitations and potential benefits of optimizations. In the example of FIG. 4, the roofline model is being used to illustrate the performance of a neural network processor in terms of operations per weight read from memory. The vertical axis illustrates the number of tera-operations (tera-ops) that can be conducted per second. The horizontal axis illustrates a number of operations or calculations executed per weight value. The number of operations executed per weight value can increase either through inherent reuse of the weight (e.g., the structure of the neural network leads to weight reuse) or through batching, that is, inputting multiple data sets into the neural network at the same time or in a pipelined fashion.

In the example of FIG. 4, the solid line 410 plotted on the graph 400 illustrates an example of the performance of a neural network processing system that stores weight values in off-chip memory. In such a system, the weight values are stored in processor memory and a neural network processor reads the weight values over a host bus or processor bus. By storing weight values in a separate memory, the neural network processing system must incur a delay whenever a weight value is read from the memory.

In the steep part 402 of the solid line 410, the number of teraops per second that can be conducted increases approximately linearly for the number of operations conducted per weight value. In the steep part 402 of the solid line 410, in order for the number of teraops per second to be increased, the reuse of any given weight must be increased. Stated in the converse, in the steep part 402 of the solid line 410, at a given reuse value, the number of teraops per second is constrained by the speed at which the weight value can be read from off-chip memory. The neural network processing system is thus said to be memory bound in the steep part 402 of the solid line 410.

In the flat part 404 of the solid line 410, the number of teraops per second has reached a maximum (about 124 teraops per second, in the illustrated example). In the flat part 404 of the solid line 410, increasing the reuse of weight value does not increase the number of teraops per second because the system has reached the maximum computation speed of the hardware. In the flat part 404 of the solid line 410, the system is said to be compute-bound.

The roofline model thus illustrates that maximum performance capable by the hardware can be achieved for a neural network processing system. But as illustrated in the graph 400, for a system with the weights stored in a separate chip from the processor, a high amount of reuse (about 1600 in the illustrated example) of each weight value is needed. As discussed previously, convolution neural networks can have a high rate of weight reuse, but many other neural networks, such as multi-layer perceptrons and recurrent neural networks, have very low weight reuse. Batching input data sets for these types of neural networks can increase reuse, but batching 1100 input data sets (assuming an inherent reuse of two for each weight value) can have other detrimental effects, such as delayed response times for the users providing the input data.

The dashed line 420 in the example of FIG. 4 illustrates the roofline model as applied to a neural network processing system where weight values are stored on-chip. In this case, weight values are stored in the memory of the neural network processor, prior to the system receiving input data and possibly at all times during the operation of the system. Having the weight values stored on chip means that the delay for reading weight values from memory is significantly reduced. As illustrated by the steep part 412 of the dashed line 420, reuse of only about 100 (as provided by this example) can overcome the memory latency. The neural network processing system thus can operate in the flat part 414 of the dashed line 420 most of the time and for all neural network types.

Figure 5:
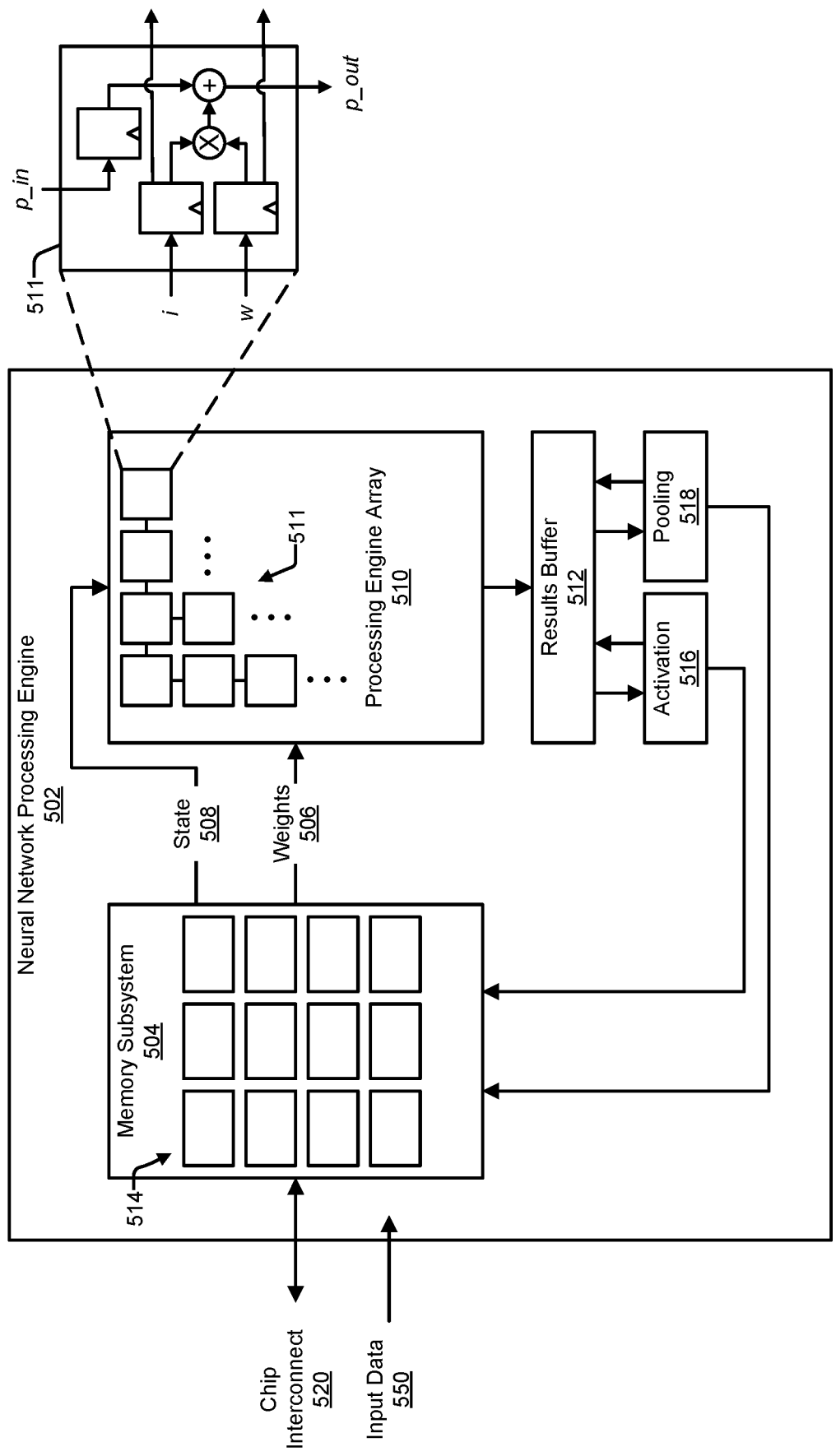
FIG. 5 illustrates an example of a neural network processing engine that can be used to execute a neural network.

In various implementations, a neural network processor can be architected to support storing of weight values on the processor. FIG. 5 illustrates an example of a neural network processing engine 502 that can be used to execute a neural network. In various implementations, the example neural network processing engine 502 is an integrated circuit that can be included in a neural network processor. The neural network processor is an integrated circuit that can have other components, including the additional neural network processing engine 502. In various implementations, the neural network processing engine 502 can include a memory subsystem 504 and a processing engine array 510. When in operation (e.g., when computing a result for a set of input data 550), the processing engine array 510 can read weight 506 and state 508 values from the memory subsystem 504. The processing engine array 510 can output computation results to a results buffer 512. In some cases, the example neural network processing engine 502 can perform an activation function using an activation 516 block and/or pooling using a pooling 518 block on the computation results, before the results are written to the memory subsystem 504.

Weights 506, in this example, are the weight values for a neural network. In various implementations, the weights 506 are post-training weights, meaning that values for the weights 506 were previously determined. State 508, in this example, can include input data 550 when a computation begins, as well as values that reflect an in-progress computation. State 508, for example, can include partial sums determined by the processing engine array 510, a current layer of the neural network that is being operated on, and/or instructions for the processing engine array 510, where the instructions may be associated with a particular layer. The weights 506 and the state 508 can be read from the memory subsystem 504 for operating on by the processing engine array 510.

In various implementations, the memory subsystem 504 can include multiple memory banks 514. In these implementations, each memory bank 514 is independently accessible, meaning that the read of one memory bank is not dependent on the read of another memory bank. Similarly, writing to one memory bank does not affect or limit writing to a different memory bank. In some cases each memory bank can be read and written at the same time. Various techniques can be used to have independently accessible memory banks 514. For example, each memory bank can have at least one read channel and may have at least one separate write channel (in some cases, the memory bank may have combined read and write channels). In these examples, the memory subsystem 504 can permit simultaneous access to the the read or write channels of multiple memory banks. As another example, the memory subsystem 504 can include arbitration logic such that arbitration between, for example, the outputs of multiple memory banks 514 can result in more than one memory bank's output being granted. In these and other examples, though globally managed by the memory subsystem 504, each memory bank can be operated independently of any other.

Having the memory banks 514 be independently accessible can increase the efficiency of the neural processing engine 502. For example, weights 506 and state 508 can be simultaneously read and provided to each row of the processing engine array 510, so that the entire processing engine array 510 can be activated in one cycle. As another example, weights 506 and state 508 can be read at the same time that intermediate results are written to the memory subsystem 504. In contrast, a single memory, while still able to provide weights 506 and state 508 to the processing engine array 510 faster than off-chip memory, may be able to service one read or write at a time. With a single memory, multiple clock cycles can be required, for example, to read weights for each row of the processing engine array 510 before the processing engine array 510 can be started.

In various implementations, the memory subsystem 504 can be configured to simultaneously service multiple clients, including the processing engine array 510, the activation 516 block, the pooling 518 block, and any external clients that access the memory subsystem 504 over a chip interconnect 520. In some implementations, being able to service multiple clients can mean that the memory subsystem 504 has at least as many memory banks as there are clients. In some cases, each row of the processing engine array 510 can count as a separate read client. In these cases, weights 506 and state 508 can be stored separately, and thus require two reads, or can be concatenated and stored together, thus requiring one read. In some cases, each column of the processing engine array 510 can output an intermediate value, such that each column can count as a separate write client. In some cases, output from the processing engine array 510 can be written into the memory banks 514 that can then subsequently provide input data for the processing engine array 510. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between memory banks 514, if needed. In some implementations, the memory subsystem 504 can include multiplexors for selecting which memory bank to output to a particular client and/or to receive input from a particular client. In these implementations, the control logic can generate select signals for the multiplexors, which can enable some or all of the memory banks 514 to service each client. In some implementations, memory banks 514 can be hardwired to particular clients. For example, a set of memory banks 514 can be hardwired to provide weights 506 and state 508 to the rows of the processing engine array 510. In these examples, the control logic can move data between memory banks 514, for example, to move intermediate results from the memory banks 514 to which the intermediate results are written, to the memory banks 514 from which the intermediate results will be read for the next round of computation.

The processing engine array 510 is the computation matrix of the neural processing engine 502. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights 506, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 256 rows, or some other number of columns and rows.

An example of a processing engine 511 is illustrated in FIG. 5. As illustrated by this example, a processing engine 511 can include a multiplier-accumulator circuit. Inputs from the left can include, for example, input data i and a weight value w, where the input data is a value taken from a set of input data and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, p_in, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the chip interconnect 520, to be output by the system.

In some implementations, the neural processing engine 502 includes an activation 516 block. In these implementations, the activation 516 block can combine the results from the processing engine array 510 into one or more output activations. For example, for a convolution neural network, convolutions from multiple channels can be summed to produce an output activation for a single channel. In other examples, accumulating results from one or more columns in the processing engine array 510 may be needed to produce an output activation for a single node in the neural network. In some implementations, activation 516 block can be bypassed.

In some implementations, the neural processing engine 502 can include a pooling 518 block. Pooling is the combining of outputs of a cluster of nodes from a layer of a neural network. The combined output can be provided to the next layer. Combining can include for example, computing a maximum value, a minimum value, an average value, a median value, or some other value determined from the outputs of the cluster of nodes. In various implementations, the pooling 518 can be selectively activated, as needed for any particular neural network.

Input data 550 can arrive over the chip interconnect 520. The chip interconnect 520 can connect the neural processing engine 502 to other components of a neural network processor, such as a Direct Memory Access (DMA) engine that can obtain input data 550 from an Input/Output (I/O) device, a storage drive, or a network interface. The input data 550 can be, for example one-dimensional data, such as a character string or numerical sequence, or two-dimensional data, such as an array of pixel values for an image or frequency and amplitude values over time for an audio signal. In some examples, the input data 550 can be three-dimensional, as may be the case with, for example, the situational information used by a self-driving car. In some implementations, the memory subsystem 604 can include a separate buffer for the input data 550. In some implementations, the input data 550 can be stored in the memory banks 514 along with the weights 506.

In various implementations, the weights 506 stored in the memory subsystem 504 can have been determined by training the neural network to perform one or more tasks. The input data 550 can include an instruction indicating the task to perform (e.g., image processing, speech recognition, machine translation, etc.). In various implementations, the neural processing engine 502 is configured for conducting inference (e.g., performing a task), rather than for training of the neural network. In some implementations, the neural processing engine 502 can be used for training, though perhaps with assistance from software to update the stored weights 506.

In various implementations, the memory subsystem 504 can include enough memory to store both intermediate results and all of the weight values for a neural network. The memory subsystem 504 should have, at a minimum, enough memory in the memory subsystem 504 to store intermediate results, but in many cases the memory subsystem 504 can include many more memory banks 514 than are needed to store just intermediate results. This additional space can be used to store all of the weight values for a neural network. For example, a neural network may have 1.5 million weights, which, when each is represented by 32 bits, can require about 6 MB of memory. Intermediate results can require, for example, 10 MB of storage space, at most. On-chip memory of 20 MB is a reasonable size, and, in the preceding example, can readily accommodate the weight values, intermediate results, and any other data that the neural processing engine 502 can need during operation.

Figure 6A:
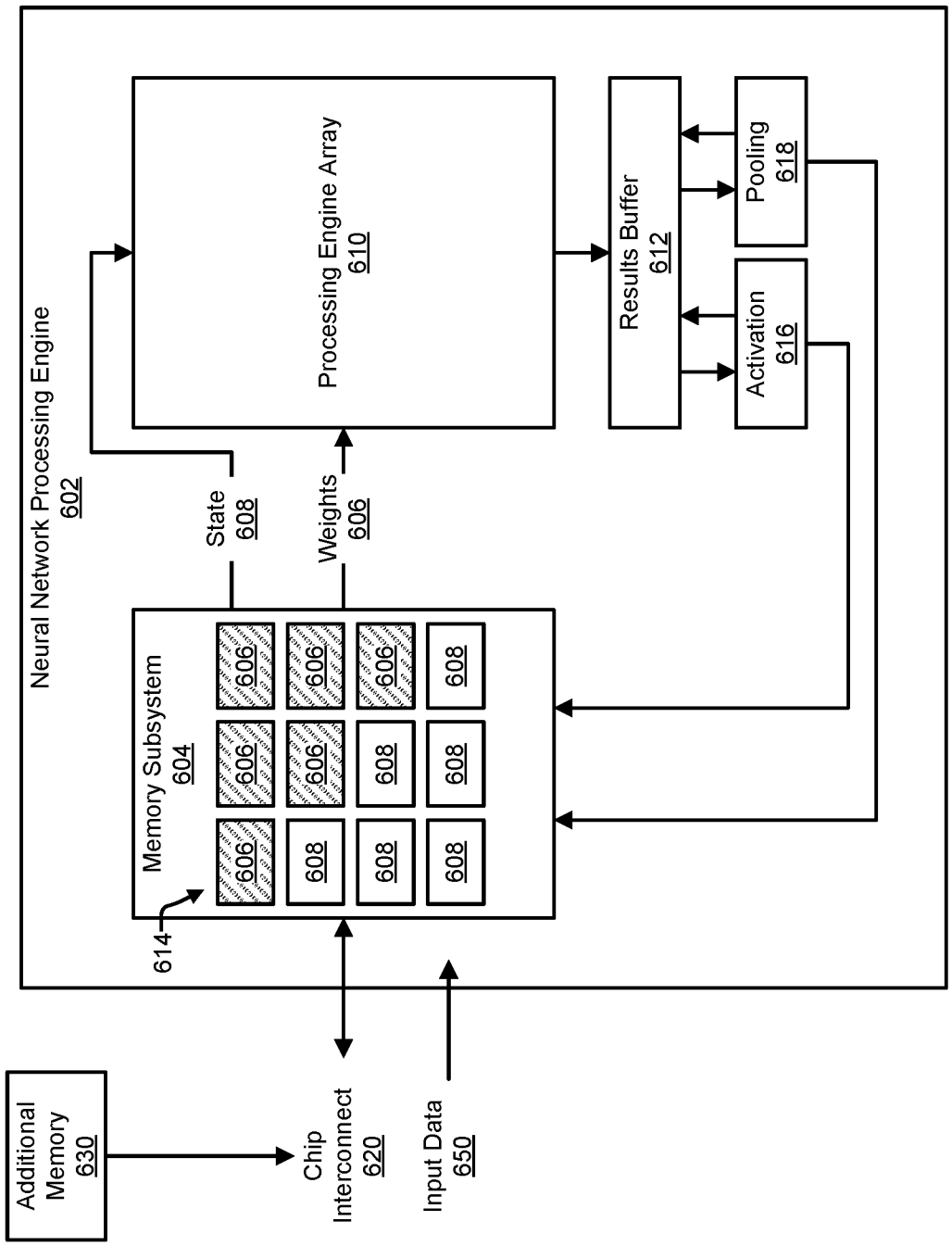
FIGS. 6A-6B illustrate an example of a neural processing engine that can be used to execute a neural network.
Figure 6B:
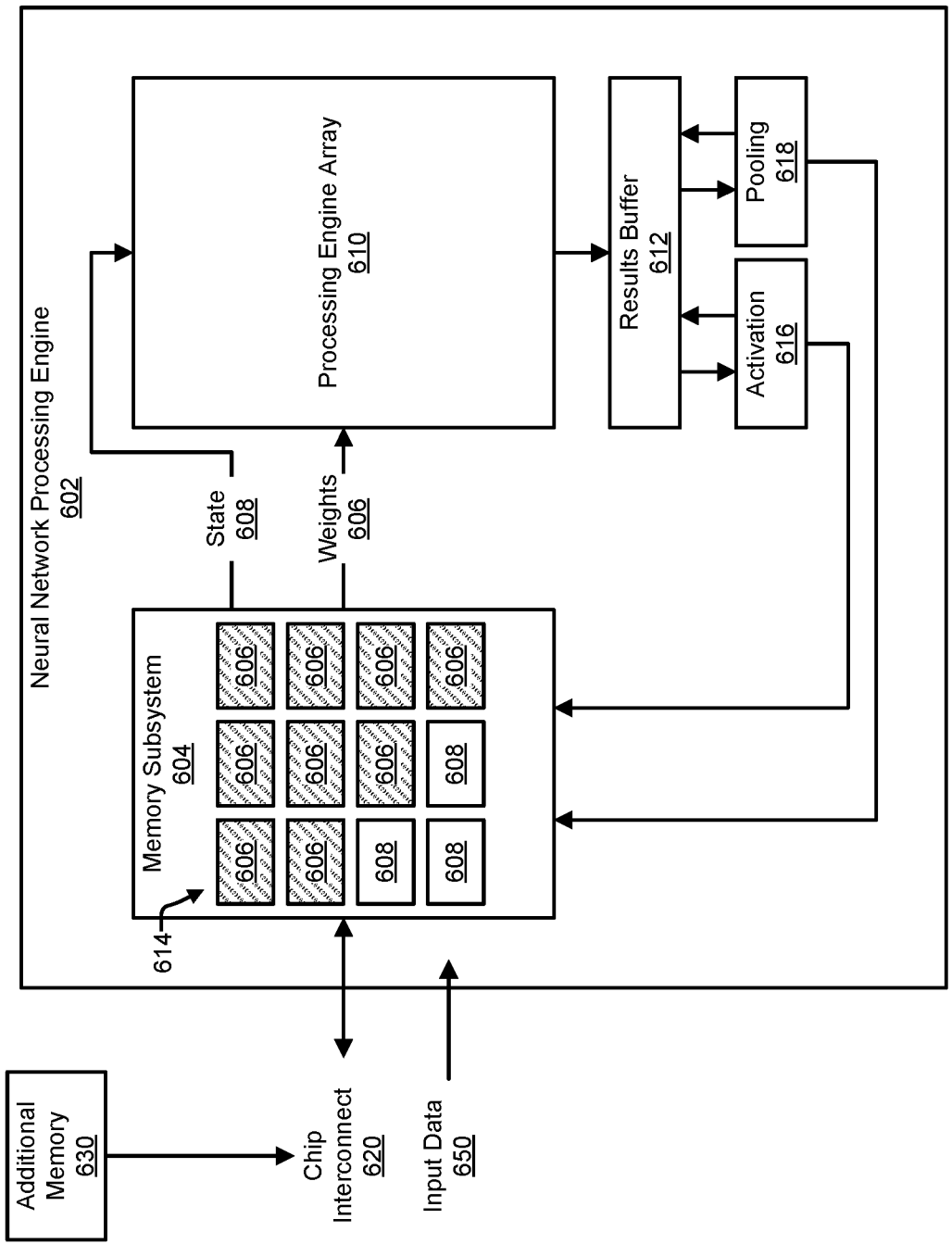

In some cases, not all of the weights for a neural network can fit in the memory of a neural processing engine. In these cases, some of the weights can be stored in the neural processing engine's memory, and the remaining weights can be loaded during the course of a computation. FIGS. 6A-6B illustrate an example of a neural processing engine 602 that can be used to execute a neural network. In various implementations, the neural network processing engine 602 can include a memory subsystem 604 and a processing engine array 610. When in operation (e.g., when computing a result for a set of input data 650), the processing engine array 610 can read weight 606 and state 608 values from the memory subsystem 604, where the state 608 values can initially include the input data 650. Though not illustrated here, the processing engine array 610 can include an array of processing engines, each of which can execute, for example, a multiply-and-accumulate operation. The processing engine array 610 can output computation results to a results buffer 612. In some cases, the example neural network processing engine 602 can perform an activation function using an activation 616 block and/or pooling using a pooling 618 block on the computation results, before the results are written to the memory subsystem 604.

In operation, the neural network processing engine 602 reads weights 606 and state 608 from memory banks 614 in the memory subsystem 604, and inputs the weights 606 and state 608 into the processing engine array 610. The processing engine array 610 can output intermediate results to the results buffer 612, from which the intermediate results can be written to the memory subsystem 604. The activation 616 block can be selectively enabled when multiple intermediate results are to be combined into one output activation. The pooling 618 block can also be selectively activated, when the outputs of a cluster of nodes is to be combined into one output. Additional cycles of reading weights 606 and state 608 and computing results can occur, until the last layer in the neural network is reached and the processing engine array 610 outputs a final result.

In various implementations, a set of memory banks 614 can initially be reserved for storing intermediate results (e.g., state 608 values). For example, as illustrated in FIG. 6A, half of the memory banks 614 can be reserved for storing immediate results. In this example, weights 606 can be stored in the remaining memory banks 614. The weights 606 can be stored prior to the neural network processing engine 602 receiving any input data 650, so that the weights 606 are ready as soon as input data 650 is received. In other examples, the memory banks 614 can be divided between storage for state 608 and storage for weights 606 in different proportions. In some implementations, individual memory banks 614 can be divided between storage for state 608 and storage for weights 606.

In the example of FIG. 6A, the weights 606 stored in the memory banks 614 are less than all of the weights for the neural network. The remaining weights are stored in additional memory, located outside of the neural network processing engine 602. The additional memory 630 can be on-chip, such as, for example, in an on-chip cache. Alternatively or additionally, the additional memory 630 can be off-chip, such as, for example, in processor memory. As discussed above, weights 606 correspond to the layers of a neural network. In various implementations, the weights 606 can be divided according to layers, such that weights 606 for the first n layers are stored in the memory subsystem 604 before input data 650 is received, and the weights 606 for the remaining m layers are stored in the additional memory 630.

Once the neural network processing engine 602 starts processing input data 650, the amount of memory needed to store state 608 values can decrease. Additionally, for some neural networks, some weights 606, once used, may not be needed anymore. For example, as discussed above, as discussed above, feed forward weights may be used only once, to compute the input values for a layer. Because some weights, once used, may not be needed again, over the course of processing a set of input data 650, the memory used to store those weights can be repurposed.

Space in the memory banks 614 formerly used to store state 608 values and weight 606 that are no longer needed can be repurposed to store additional weight 606 values. As illustrated by FIG. 6B, as a computation progresses, more of the memory banks 614 can be designated for storing weights 606.

For example, on every clock cycle, a set of weights 606 can be read out of various memory banks 614 and intermediate results can be stored as state 608 values. The memory subsystem 604, using control logic, can keep track of the memory used by the weights 606 that have not yet been used and the amount of space currently occupied by the state 608 values. Alternatively or additionally, software can manage the allocation of space in the memory subsystem 604. As less memory space is needed to store the state 608, the memory subsystem 604 (or software) can determine to assign more of the memory space to storing weights 606. Additionally, at various times, the memory subsystem 604 can send requests over the chip interconnect 620 for more weights to be read from the additional memory 630. Over the course of processing one set of input data, the neural network processing engine 602 can gradually move all of the weights 606 for the neural network into the memory banks 614.

In some implementations, as processing of a set of input data nears completion, the number of weights 606 that are still needed can become smaller and smaller. As the number of remaining weights 606 decreases, the assignment of memory to weights 606 or state 608 can be reversed, so that gradually more of the memory is set aside for storing state 608. By the end of the computation, the memory can again be divided as illustrated in FIG. 6A.

As noted above, in some implementations, weights 606, once used, can be deleted from the memory subsystem 604, in that the memory occupied by these weights 606 can be given over to storing weights 606 that are still needed. In these implementations, as processing of a set of input data winds down, the weights 606 from initial layers can be reloaded into the memory subsystem 604. Once processing of the input data is done, the neural network processing engine 602 can thus be ready to process the next input data.

When weights 606 that are not currently present in the memory subsystem 604 are in processor memory, reading the weights 606 from processor memory can cause the processing engine array 610 to stall while waiting for the weights 606 to be loaded. In various implementations, one technique for avoiding stalls caused by reading from processor memory is to queue read transactions to the processor memory well in advance of the weights 606 being needed. Another technique is to pre-fetch the weights 606 into an on-chip cache. Another technique is to use the memory of another neural network processing engine, as discussed further below. In various implementations, these and other techniques can be combined to suit the requirements of a given system.

In various implementations, space that becomes available, over the course of a computation, in the memory subsystem of a neural network processing engine can be used to store the weights of another neural network. This second neural network may have been trained to perform a different task than the neural network originally loaded into the neural network processing engine. By switching the weights stored in the neural network processing engine from the weights of the first neural network to the weights of a second neural network, the neural network processing engine can sequentially execute different tasks.

Configuring a neural network processing engine to switch between different neural networks and to sequentially perform different tasks can be useful in certain situations. For example, the inputs from a single user can require multiple operations, such as, for example, natural language understanding following by machine translation. While a neural network can be capable of performing a complex task, such as natural language understanding, one neural network may not be capable of both natural language understanding and also machine translation. Thus, frequently one neural network can be used to perform natural language understanding while another neural network can be used to perform machine translation.

To optimize the speed at which a neural network processor produces results for different (possibly unrelated) tasks, the neural network processor can be configured to perform a fast context switch. A context, as applied to a neural network processing system, describes one neural network, including the weights for the neural network and the computations executed to perform a task for which the neural network was trained. A context switch can involve reprogramming a neural network processing engine to execute a second neural network after having been configured to execute a first neural network. Reprogramming the neural network processing engine can include loading the weights for the second neural network into the memory of the neural network processing engine.

A fast context switch can occur when the neural network processing engine is ready to execute the second neural network immediately upon completing a computation using the first neural network. Immediately can mean, for example, within one or a few clock cycles. In various implementations, as a computation for a first neural network progresses and memory space becomes available in the memory of a neural network processor, the weights for a second neural network can be stored in the available space. Once the first computation completes, some or all of the weights for the second neural network are present in the memory, and a computation using these weights can begin.

Figure 7A:
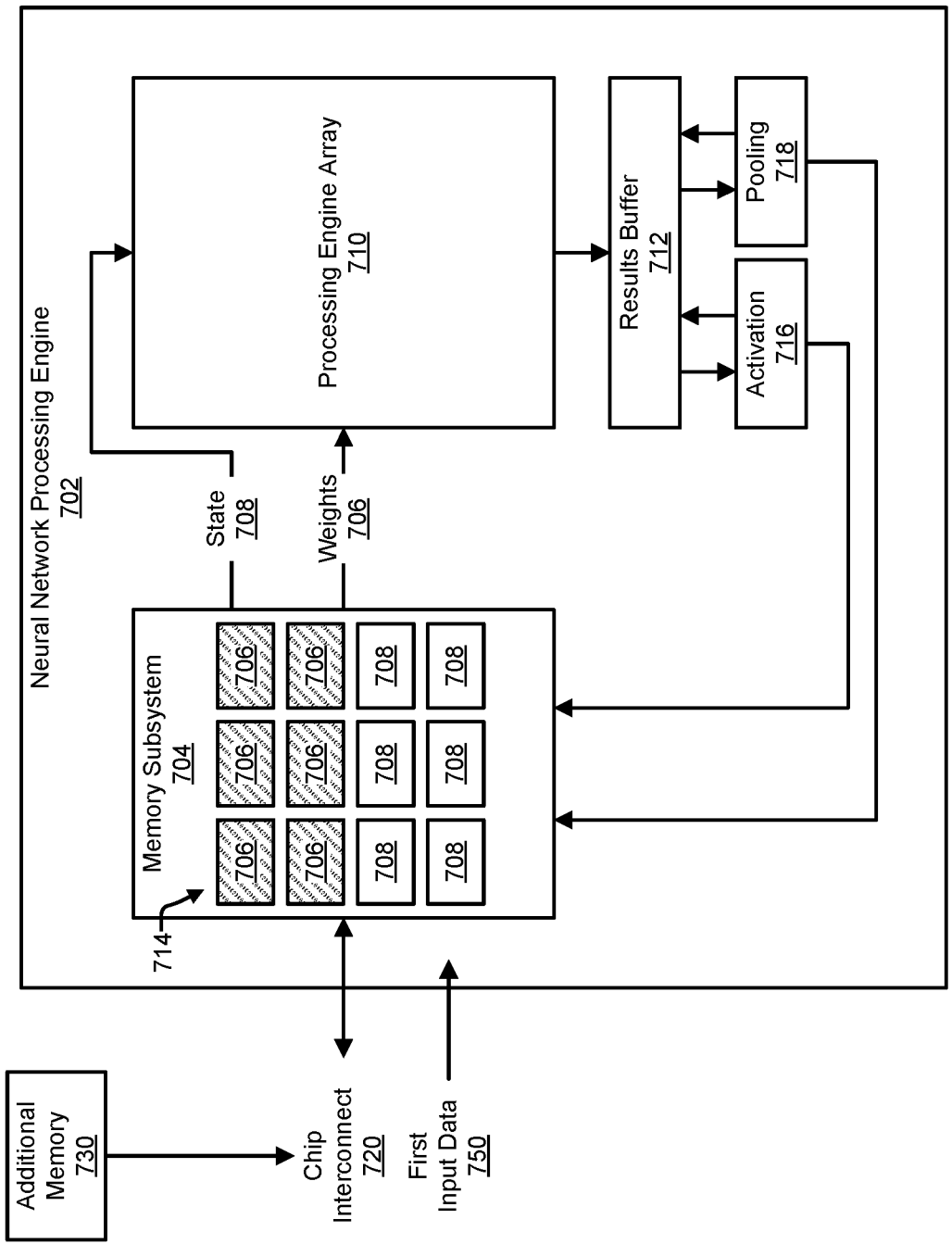
FIGS. 7A-7C illustrate an example of a neural network processing engine that can be used to execute a neural network.
Figure 7B:
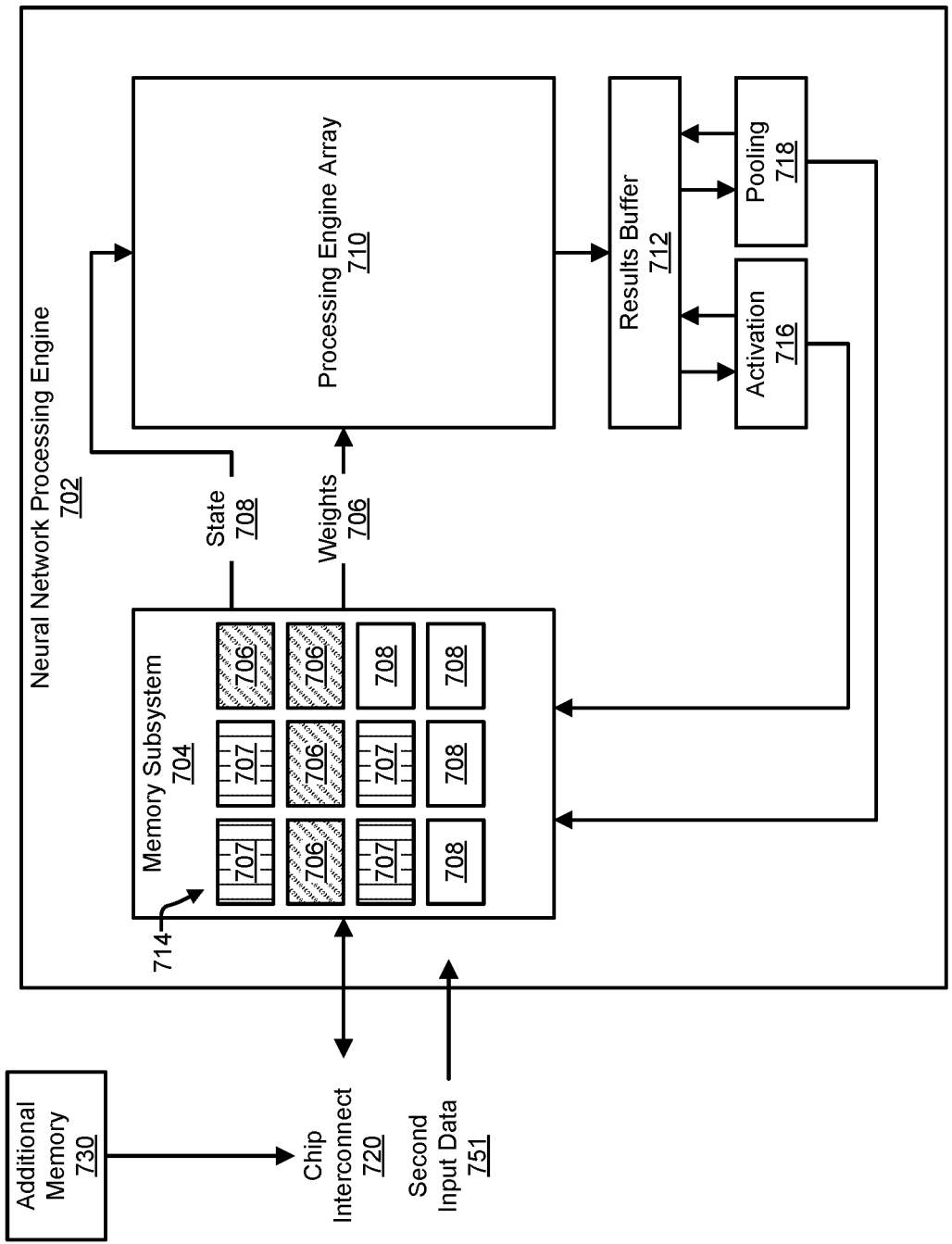
Figure 7C:
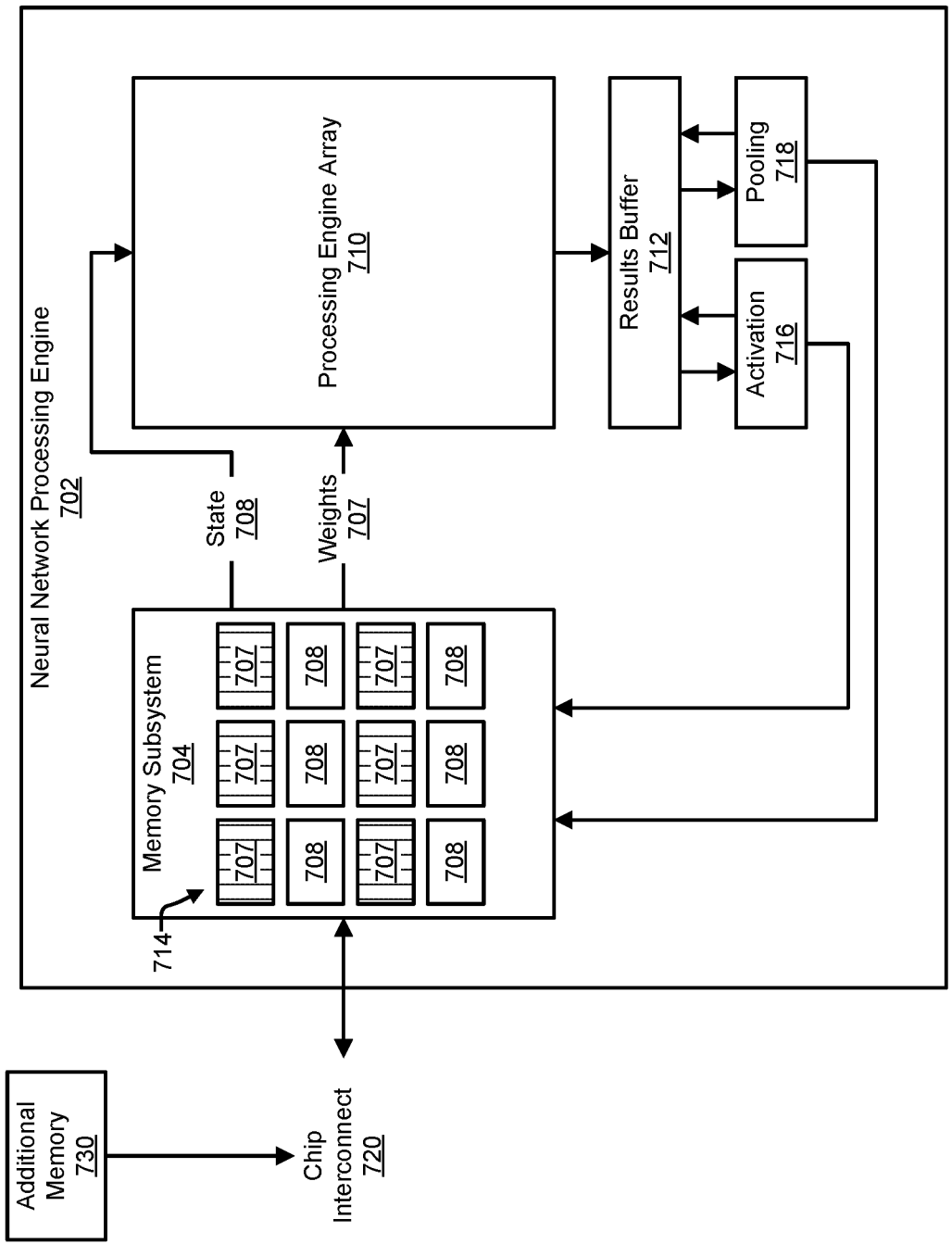

FIGS. 7A-7C illustrate an example of a neural network processing engine 702 that can be used to execute a neural network. In various implementations, the neural network processing engine 702 can include a memory subsystem 704 and a processing engine array 710. When in operation (e.g., when computing a result for a set of input data), the processing engine array 710 can read weight 706 and state 708 values from the memory subsystem 704, where the state 708 values can initially include the input data. Though not illustrated here, the processing engine array 710 can include an array of processing engines, each of which can execute, for example, a multiply-and-accumulate operation. The processing engine array 710 can output computation results to a results buffer 712. In some cases, the example neural network processing engine 702 can perform an activation function using an activation 716 block and/or pooling using a pooling 718 block on the computation results, before the results are written to the memory subsystem 704.

In operation, the neural network processing engine 702 reads weights 706 and state 708 from memory banks 714 in the memory subsystem 704, and inputs the weights 706 and state 708 into the processing engine array 710. The processing engine array 710 can output intermediate results to the results buffer 712, from which the intermediate results can be written to the memory subsystem 704. The activation 716 block can be selectively enabled when multiple intermediate results are to be combined into one output activation. The pooling 718 block can also be selectively activated, when the outputs of a cluster of nodes is to be combined into one output. When neither activation 716 nor pooling 718 are enabled, results from the processing engine array 710 can be moved directly from the results buffer to the memory subsystem 704. Additional cycles of reading weights 706 and state 708 and computing results can occur, until the last layer in the neural network is reached and the processing engine array 710 outputs a final result. In some cases, the final result can be operated on by the activation 716 and/or the pooling 718 blocks prior to being written to the memory subsystem 704.

As illustrated in FIG. 7A, in various implementations, a portion of the memory banks 714 can be used to store weight 706 values and a different portion can be used to store state 708 values. In these implementations, the weight 706 values for a neural network can be stored in the portion of the memory banks 714 set aside for the weights 706, prior to the neural network processing engine 702 receiving any input data. In some cases, the weights 706 stored in the memory banks 714 can include all of the weights for the neural network. In some cases, the stored weights 706 can include fewer than all of the weights for the neural network, with the remaining weights being read from an additional memory 730 when a computation is in-progress (as discussed above). Also in these implementations, during the course of a computation, intermediate results (e.g., state 708 values) can be stored in the portion of the memory banks 714 reserved for storing state 708 values. The portion of the memory banks 714 used to store weights 706, the portion used to store state 708, and any unused portion generally do not overlap.

In the example of FIG. 7A, the weights 706 stored in the memory subsystem 704 when first input data 750 is received are the weights 706 for a first neural network. The first neural network, including the weights 706, the task (referred to in the following examples as the first task) the first neural network was trained to perform, and possibly also instructions for the processing engine array 710, activation 716 block and/or pooling 718 block, can represent a first context for the neural network processing engine 702. When the first input data 750 is received by the neural network processing engine 702 the first task will be performed on the first input data 750.

As discussed above, as the computation for performing the first task progresses, space in the memory subsystem 704 may become available or may be considered unused. For example, the portion of the memory banks 714 used to store state 708 values can become smaller as the amount of memory needed to store intermediate results becomes less. In some examples, logic in the memory subsystem 704 can determine the amount of memory needed to store intermediate results. In some examples, software can determine the amount of memory needed to store intermediate results, and can, accordingly reduce the portion of memory banks 714 that is being used to store the state 708 values. As a further example, the portion of the memory banks 714 used to store the weights 706 for the first neural network can become smaller due to weight 706 values, having been used, being marked as no longer needed. In some examples, logic in the memory subsystem 704 can mark address locations of used weights as available. In some examples, software can keep track of the weight values that are still needed and weight values that have been used and are no longer needed.

In various implementations, as space in the memory subsystem 704 becomes unused or available, as illustrated in FIG. 7B, weight 707 values for a second neural network can be stored in the available space. In the example illustrated in FIG. 7B, several memory banks 714 formerly used to store weights 706 for the first neural network and several memory banks 714 formerly used to store state 708 values have been repurposed to store the weight 707 values for a second neural network. The second neural network may have been trained to perform a task, referred to hereafter as the second task, which may be different from the first task. The weights 707, the second task, and possibly commands for the processing engine array 710, activation 716 block, and/or pooling 718 block can be considered a second context for the neural network processing engine 702. The weights 707 can be read, over a chip interconnect 720, from an additional memory 730, which can be an on-chip cache, a processor memory, and/or the memory of another neural network processing engine 702.

In various implementations, storing of the weights 707 for the second neural network can occur during computation of a result for the first input data 750. That is, as the computation of the result for the first input data 750 progresses and space becomes available in the memory banks 714, the neural network processing engine 702 can start loading the now unused space with the weights 707 for the second neural network. Storing of the weights 707 for the second neural network can start concurrently with receipt by the neural network processing engine 702 of second input data 751, on which the second task will be performed. In some cases, the second input data 751 is received while the neural network processing engine 702 is in the process of computing a result for the first input data 750. In some cases, storing of the weights 707 for the second neural network can start before or after the second input data 751 is received. In some examples, receipt of the second input data 751 triggers loading of the weights 707 for the second neural network. In some examples, receipt of the second input data 751 triggers computation of a result for the second input data 751.

In some cases, only memory banks 714 used to store the weights 706 for the first neural network are repurposed to store the weights 707 for the second neural network. In these cases, the portion of the memory banks 714 used to store the state 708 is always available to store intermediate results.

In some cases, repurposing the memory banks 714 can include moving data between the memory banks 714. For example, as the portion of the memory banks 714 used to store state 708 becomes smaller, not-yet-used weights 706 can be moved into this portion. In this example, the portion of the memory banks 714 formerly occupied by the weights 706 for the first neural network can gradually become occupied by the weights 707 for the second neural network, so that once the context switch is complete the allocation of memory is the same as for the first neural network.

In various implementations, once the neural network processing engine 702 completes computation of a result for the first input data 750, the neural network processing engine 702 can be ready to perform the computation for the second input data 751. In the example illustrated in FIG. 7C, the neural network processing engine 702 has completed the context switch from the first neural network to the second neural network. As illustrated in this example, the weights 707 for the second neural network have been loaded into the memory subsystem 704 and the neural network processing engine 702 is ready to start computing a result for the second input data 751.

In various implementations, the neural network processing engine 702 can begin computing a result for the second input data 751 within one or two cycles of completing the computation for the first input data 750. In some implementations, the neural network processing engine 702 can begin computing a result for the second input data 751 before the result for the first input data 750 is complete. For example, the final cycles of the computation for the first input data 750 may still be progressing through processing engine array 710 as state 708 and weights 707 for computing a result for the second input data 751 are being input into the processing engine array 710. In this example, computations for the first input data 750 and the second input data 751 may be present in the processing engine array 710 at the same time.

In some cases, the weights 707 now stored in the memory subsystem 704 include all the weights for the second neural network. In some cases, the weights 707 are fewer than all of the weights for the second neural network, and any remaining weights can be read from the additional memory 730 as space becomes available in the memory banks 714.

In some cases, in the example illustrated in FIG. 7C, there may still be some data related to the first context in the memory subsystem 704. For example, some weight 706 values for the first neural network, such as the last ones used, may still be in the memory banks 714. In this example, once the computation for the second input data 751 begins, these weights 706 can be overwritten. As another example, a final result of the computation for the first input data 750 may still be in the memory banks 714, waiting to be read out over the chip interconnect 720. The final result can remain in the memory subsystem 704 while the computation for the second input data 751 is in progress, or can be read out before the computation for the second input data 751 begins.

Loading the weight 707 values for the second neural network while the neural network processing engine 702 is computing a result using the weight 706 values for the first neural network enables the neural network processing engine 702 to perform a fast context switch between the first neural network and the second neural network. A fast context switch can enable the neural network processing engine 702 to increase throughput and produce results faster.

Another technique for increasing throughput through a neural network processer is to equip the neural network processor with multiple neural network processing engines that can operate in parallel. The neural network processor can, for example, execute multiple, possibly different neural networks on different neural network processing engines, at the same time. As another example, the neural network processor can batch processes more sets of input data, thus increasing reuse of weight values.

Figure 8:
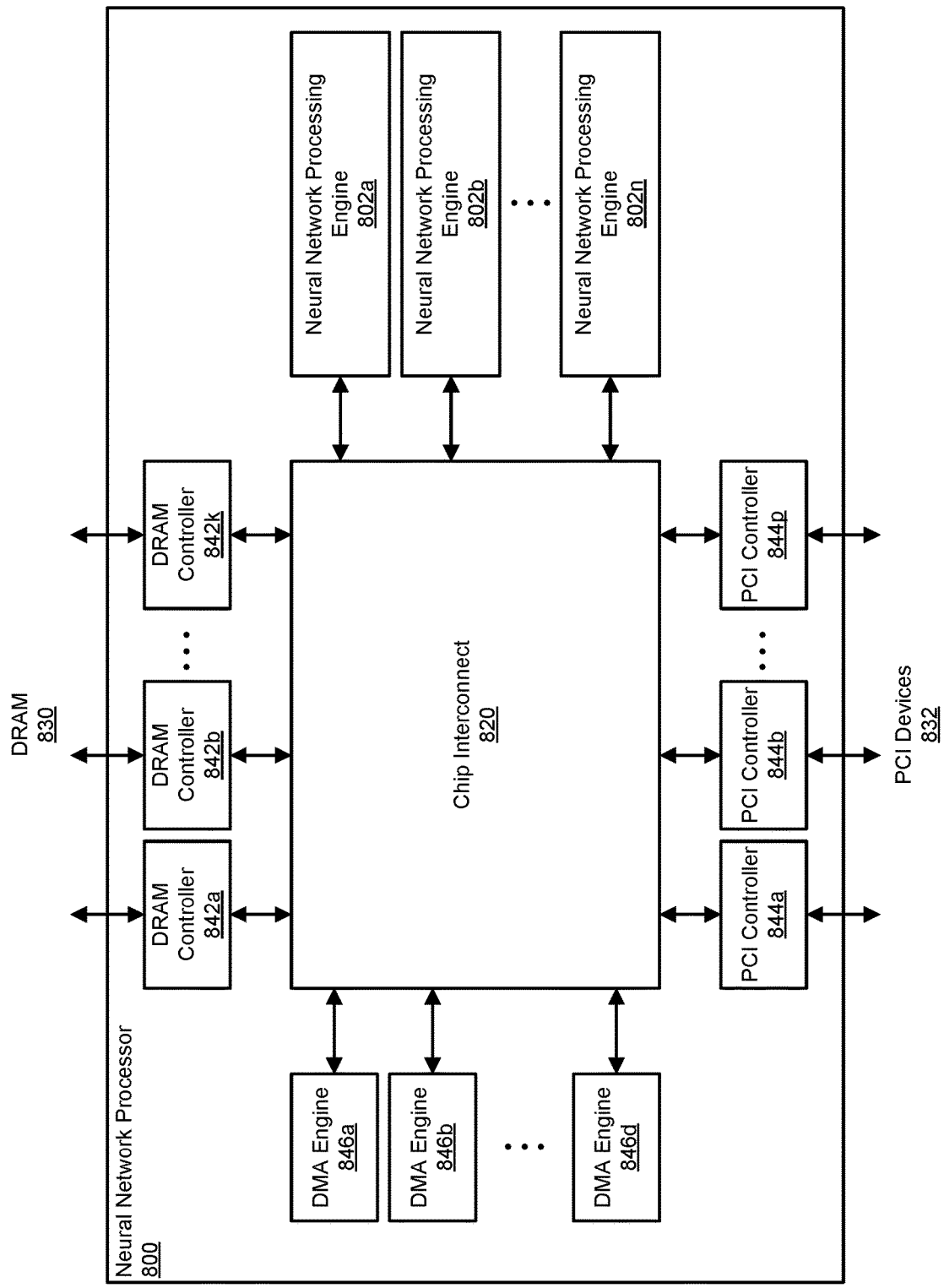
FIG. 8 illustrate an example of a neural network processor that has multiple neural network processing engines.

FIG. 8 illustrates an example of a neural network processor 800 that has multiple neural network processing engines 802*a*-802*n*. Each of the neural network processing engines 802*a*-802*n* can include a memory subsystem and processing engine array, and can execute the computation required for a neural network to perform a task for which the neural network was programmed. In the illustrated example, the neural network processor 800 includes n neural network processing engines 802*a*-802*n*.

The example neural network processor 800 further includes DRAM controllers 842*a*-842*k* for communicating with processor memory, implemented in this example using DRAM 830. In the illustrated example, the neural network processor 800 includes k DRAM controllers 842*a*-842*k*, each of which may be able to communicate with an independent set of banks of DRAM. In other examples, other types of RAM technology can be used for the processor memory. The DRAM controllers 842*a*-842*k* can also be referred to as memory controllers.

The example neural network processor 800 further includes Peripheral Component Interconnect (PCI) controllers 844*a*-844*p* for communicating with PCI devices 832 in the system. In this example, PCI is the bus protocol being used to implement a processor bus. The processor bus can connect the neural network processor 800 to PCI devices 832 such as, for example, I/O devices, memory controllers, storage devices, and/or network interface cards, among other things. In this example, the neural network processor 800 includes p PCI controllers 844*a*-844*p*, each of which may include a separate root complex and may communicate with a separate set of PCI devices 832. In other examples, other standardized bus protocols, such as Ultra Path Interconnect (UPI) can be used for the host bus. In other examples, a proprietary bus protocol can be used.

The example neural network processor 800 further includes DMA engines 846*a*-846*d* that can move data between the neural network processing engines 802*a*-802*n*, DRAM controllers 842*a*-842*k*, and PCI controllers 844*a*-844*p*. In the illustrated example, the neural network processor 800 includes d DMA engines 846*a*-846*d*. In some implementations, the DMA engines 846*a*-846*d* can be assigned to specific tasks, such as moving data from the DRAM controllers 842*a*-to the neural network processing engines 802*a*-802*n*, or moving data between the PCI controllers 844*a*-844*p* and the neural network processing engines 802*a*-802*n*. In some implementations, at least one DMA engine 846*a*-846*d* can be dedicated to each neural network processing engine 802*a*-802*n*. In some implementations, the DMA engines 846*a*-846*d* can be treated as a pool instead of being dedicated to a function or component, such that whenever data needs to be moved, an available DMA engine 846*a*-846*d* is engaged.

In the example neural network processor 800, the various components can communicate over a chip interconnect 820. The chip interconnect 820 primarily includes wiring for routing data between the components of the neural network processor 800. In some cases, the chip interconnect 820 can include a minimal amount of logic, such as multiplexors to control the direction of data, flip-flops for handling clock domain crossings, and timing logic.

Figure 9:
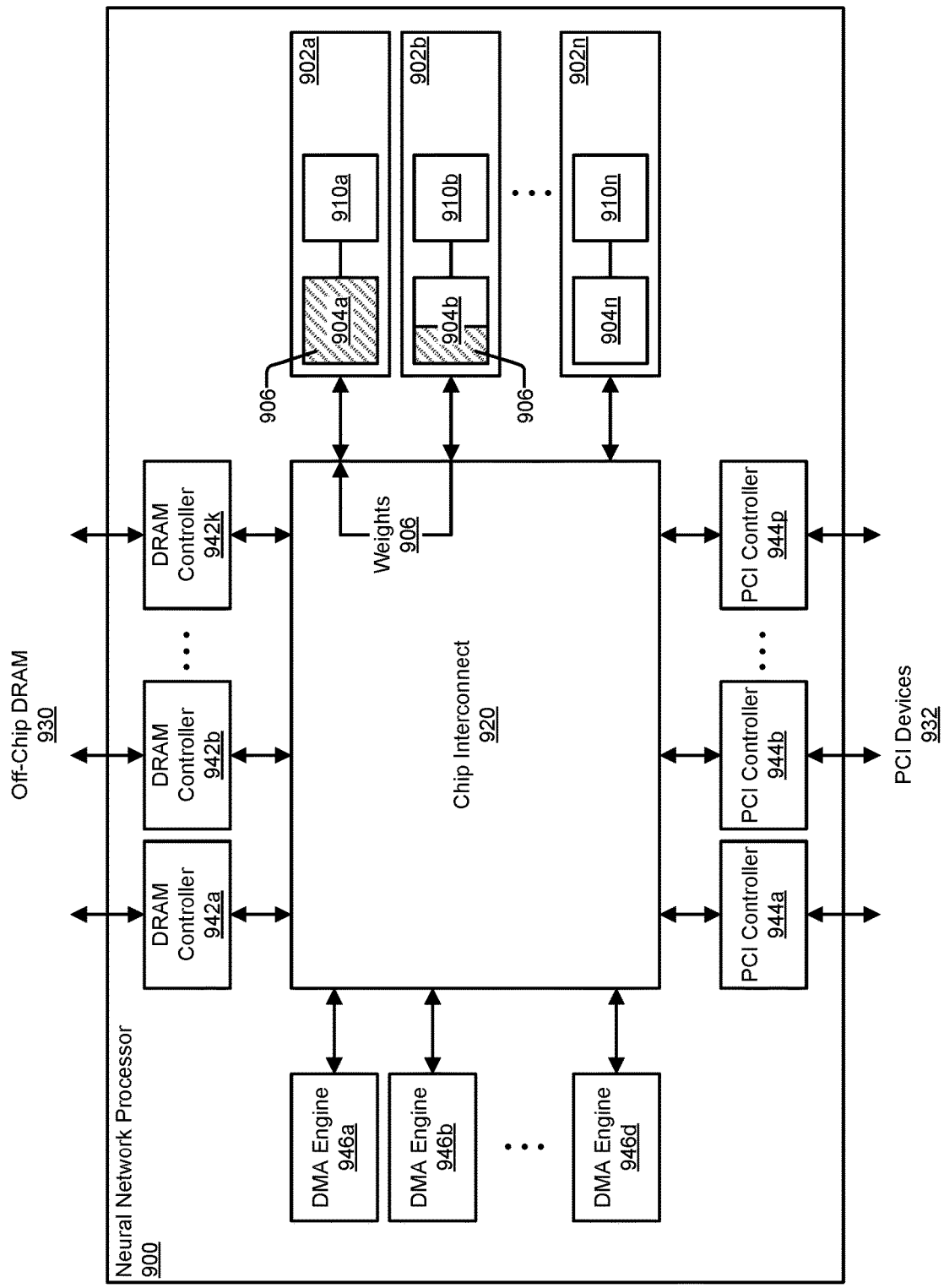
FIG. 9 illustrates an example of a neural network processor configured for the weights of a neural network to be stored in the memory subsystems of two neural network processing engines.

FIG. 9 illustrates an example of neural network processor 900, that has been configured for the weights 906 of a neural network to be stored in the memory subsystems of two neural network processing engines 902*a*-902*b*. The neural network processor 900 can be similar to the neural network processor 800 illustrated in FIG. 8. As illustrated in FIG. 9, each neural network processing engine 902*a*-902*n* includes a memory subsystem 904*a*-904*n* and a processing engine array 910*a*-910*n*. In various implementations, each of the memory subsystems 904*a*-904*n* can store the weights for a neural network, such that each of the neural network processing engines 902*a*-902*n* can independently execute a neural network.

In some cases, one of the neural network processing engines 902*a*-902*n*, such as the second neural network processing engine 902*b*, may not need all of the space in the memory subsystem 904*b* of the neural network processing engine 902*b*. For example, the neural network processing engine 902*b* may need less than all of the space in the memory subsystem 904*b* to store the weights for a neural network. Alternatively, as another example, the neural network processing engine 902*b* may have been designated as obtaining weight values only or primarily from DRAM 930 (e.g., the neural network that the neural network processing engine 902*b* is executing has a high degree of weight reuse).

In various implementations, the available memory in the second neural network processing engine 902*b* can be used to store weights 906 for a neural network that is being executed by the first neural network processing engine 902*a*. The weights 906 for the neural network may be, for example, too numerous to store entirely in the memory subsystem 904*a* of the first neural network processing engine 902*a*. As noted previously, the weights 906 that do not fit in the first neural network processing engine 902*a* can be stored in DRAM 930. Storing these weights in the available space of the second neural network processing engine 902*b* can be much more efficient, however, since copying weights 906 from one neural network processing engine 902*b* to another neural network processing engine 902*a* can be done much faster than reading the weights 906 from DRAM 930.

As discussed above, the weights 906 can be copied from the second neural network processing engine 902*b* to the first neural network processing engine 902*a* as the first neural network processing engine 902*a* is processing a set of input data. In some cases, used-and-no-longer-needed weights 906 can be moved from the first neural network processing engine 902*a* to the second neural network processing engine 902*b* until the processing of the input data is complete. In various implementations, a DMA engine 946*a*-946*d* can copy or move data between the neural network processing engines 902*a*-902*n*, so that the neural network processing engines 902*a*-902*n* need not take time away from executing computations for the neural networks.

Any space in the memory subsystem 904*b* of the second neural network processing engine 902*b* that is not used to store weights 906 for the first neural network processing engine 902*a* can be used by the neural network processing engine 902*b* to perform its own computations.

Figure 10:
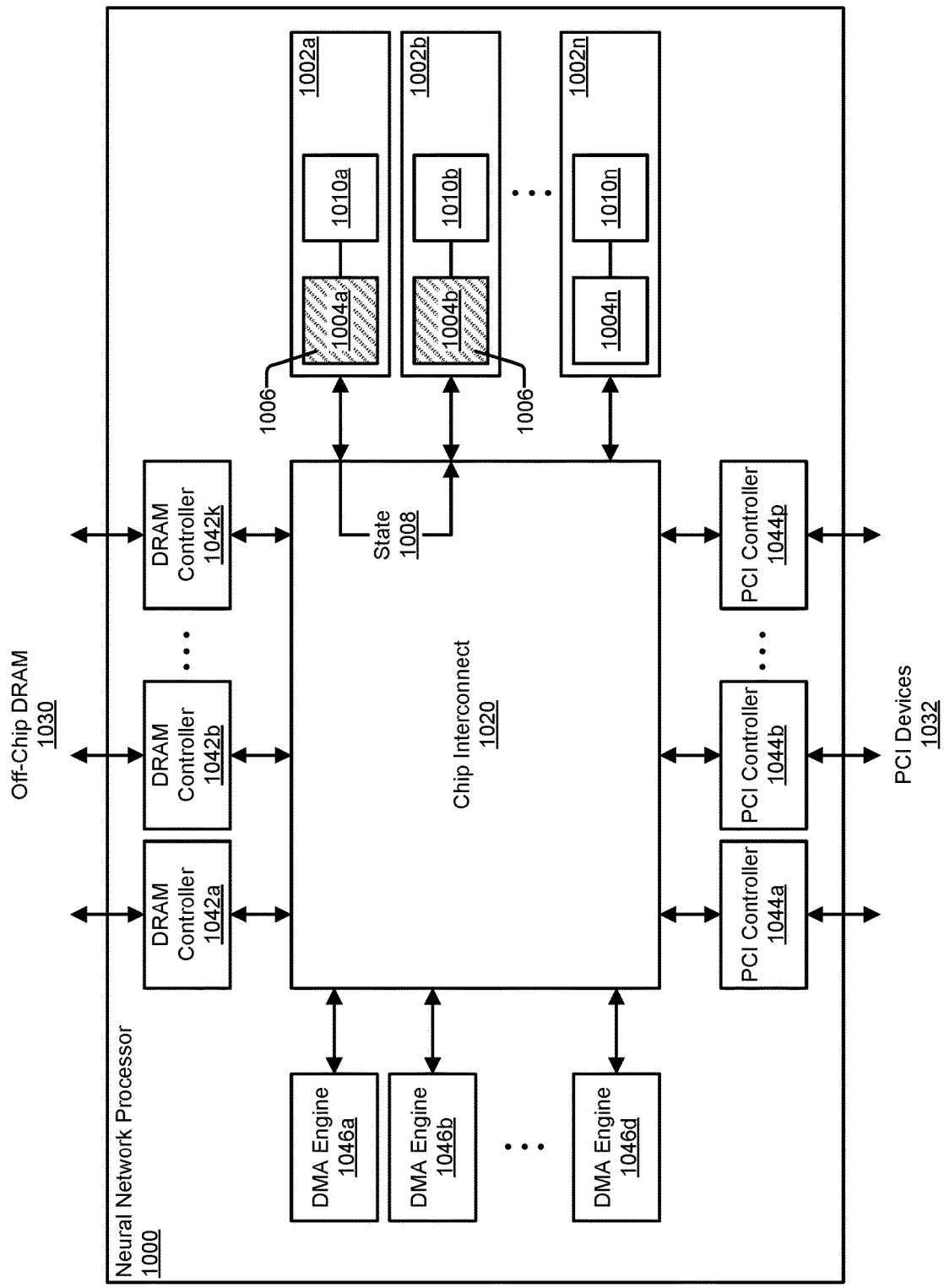
FIG. 10 illustrates an example of a neural network processor configured for the weights of a neural network to be stored in the memory subsystems of two neural network processing engines.

In some implementations, instead of moving weights between the neural network processing engines 1002*a*-1002*n*, an in-progress computation can be moved instead. FIG. 10 illustrates an example where of a neural network processor 1000 that has been configured for the weights 1006 of a neural network to be stored in the memory subsystems of two neural network processing engines 1002a-1002b. The neural network processor 1000 can be similar to the neural network processor illustrated in FIG. 8. As in the example of FIG. 9, in the example of FIG. 10, the weights 1006 for a neural network are stored in the memory subsystems 1004a-1004b of two neural network processing engines 1002a-1002b, possibly because the amount of memory needed to store all the weights 1006 on-chip is more than the amount of memory of any one neural network processing engine 1002a-1002n.

As noted previously, the weights 1006 can be associated with specific layers of a neural network. Thus, weights 1006 for a first set of layers can be stored in the first neural network processing engine 1002a and the weights 1006 for the remaining layers can be stored in the neural network processing engine 1002b.

In various implementations, when input data is received for the neural network associated with the weights 1006, the input data can be provided to the first neural network processing engine 1002a, since the first neural network processing engine 1002a has the weights for the initial layers of the neural network. The first neural network processing engine 1002a can proceed to process the input data, reading weights 1006 from the memory subsystem 1004a, computing intermediate results with the processing engine array 1010a, and writing the intermediate results back to the memory subsystem 1004a.

Once the first neural network processing engine 1002a has executed computations for each layer for which the first neural network processing engine 1002a has weights, the first neural network processing engine 1002a can cause the in-progress computation to be moved to the second neural network processing engine 1002b. Moving the in-progress computation can include moving state 1008 values. The state 1008 can include, for example, a set of intermediate results. In some examples, the state 1008 can further include identification of the last layer that was processed, control inputs for the processing engine array 1010b, a state value for an activation function, and/or a state value for a pooling function, among other things. In various implementations, a DMA engine 1046a-1046d can be engaged to copy state 1008 values from the first neural network processing engine 1002a to the second neural network processing engine 1002b.

In various implementations, once the state 1008 has been copied to the second neural network processing engine 1002b, the neural network processing engine 1002b can receive a signal to resume the in-progress computation. The signal can take the form of, for example, an interrupt, a write to a register in the second neural network processing engine 1002b, or an instruction sent over a control bus between the neural network processing engines 1002a-1002n, among other examples. In some cases, the second neural network processing engine 1002b can automatically start computation. For example, intermediate results can be input in the same manner as input data, thus activating the same mechanism in the second neural network processing engine 1002b that would be activated for input data.

In various implementations, resuming an in-progress computation can include inputting weights 1006 from a middle layer into the processing engine array 1010b, along with intermediate results from the first neural network processing engine 1002a. In various implementations, the neural network processing engine 1002b does not require any special or different behavior for resuming an in-progress computation, either because the neural network processing engine 1002b can treat the in-progress computation as the start of a new computation, or because the neural network processing engine 1002b can pick up exactly where the first neural network processing engine 1002a left off.

In the examples of FIGS. 9 and 10, solutions are provided for when all of the weights for a neural network cannot be kept in the local memory of a processing engine array. Though some latency can be incurred in moving data between neural network processing engines, this latency will still be quite small compared to the latency incurred when reading weights from off-chip memory.

Figure 11:
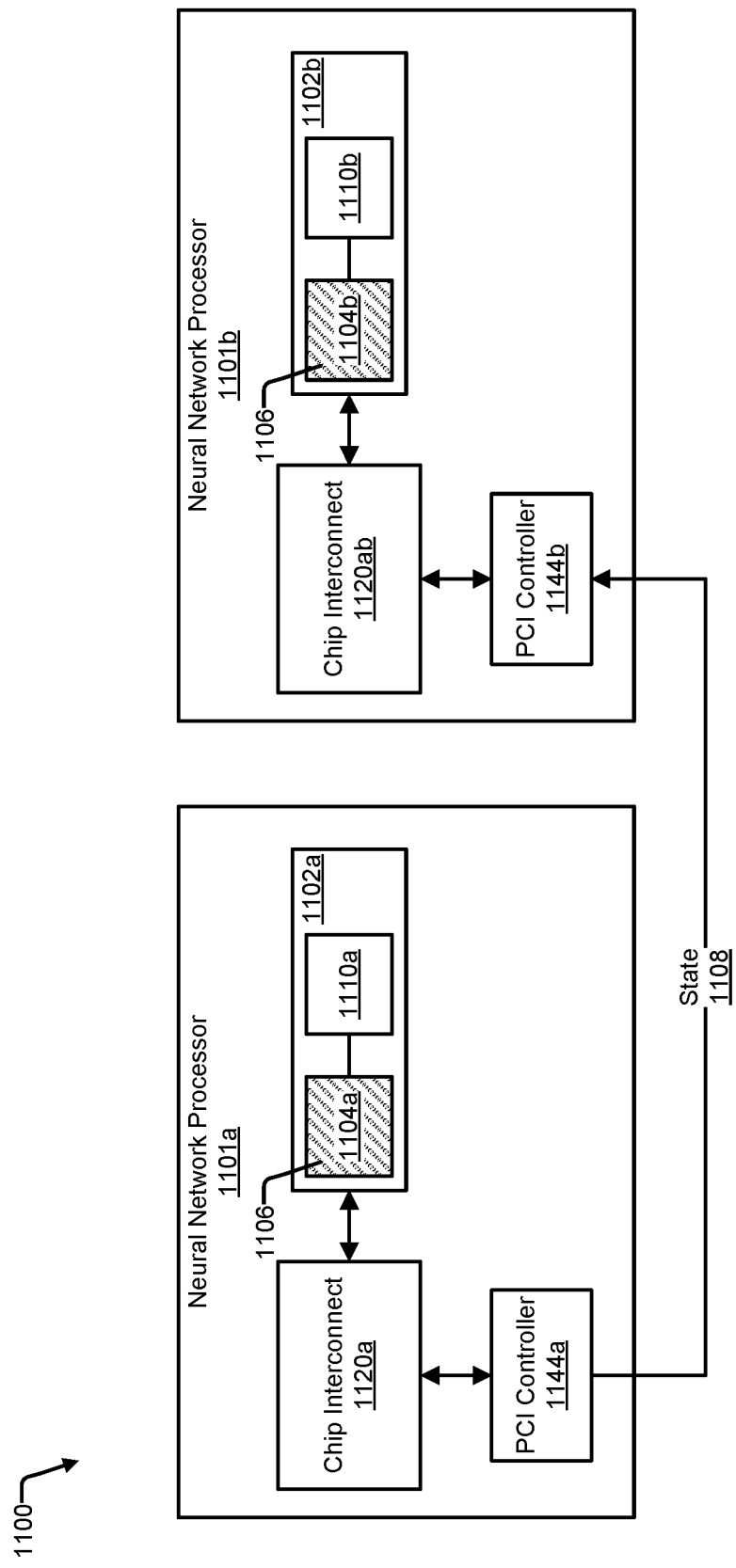
FIG. 11 illustrates another solution for storing all the weights for a neural network on-chip.

FIG. 11 illustrates another solution for storing all the weights for a neural network on-chip when all of the weights cannot be stored local to a single processing engine array. FIG. 11 illustrates an example of a neural network processing system 1100 that includes two neural network processors 1101a-1101b. In this example, each neural network processor 1101a-1101b is a separate chip, having separate dies and being enclosed in different packages. The neural network processors 1101a-1101b can communicate with each other and other components in the neural network processing system 1100 using a host bus or processor bus. The processor bus can be implemented using, for example, a PCI-based protocol.

In various implementations, each of the neural network processors 1101a-1101b include at least one, and possibly more, neural network processing engines 1102a-1102b. As discussed above, each of the neural network processing engines 1102a-1102b can include a processing engine array 1010a-1010b and a memory subsystem 1104a-1104b.

For communications between the neural network processing engines 1102a-1102b and other components in each neural network processor 1101a-1101b, the neural network processors 1101a-1101b can include a chip interconnect 1020a-1020b. The chip interconnect 1020a-1020b can include primarily wiring for routing signals between the components of the neural network processors 1101a-1101b, and possibly also some timing logic.

Other components of the neural network processors 1101a-1101b can include a PCI controller 1144a-1144b for communicating with the processor bus. In various implementations, the neural network processors 1101a-1101b can include components not illustrated, such as DRAM and DMA controllers.

In the example of FIG. 11, the weights 1106 for a neural network can be divided in two, with the two parts being the same in size or different in size. The first set of weights 1106, corresponding to the initial layers of the neural network can be loaded into the memory subsystem 1104a of the neural network processing engine 1102a in the first neural network processors 1101a. The second set of weights 1106 can be loaded into the memory subsystem 1104b of the neural network processing engine 1102b in the second neural network processor 1101b. In this configuration, when input data is received for the neural network, the input data can be provided to the neural network processing engines 1102a in the first neural network processor 1101a. The neural network processing engines 1102a can proceed with computations for the input data.

Once the neural network processing engine 1102a has executed computations for each of the layers for which the neural network processing engine 1102a has weights 1106, the neural network processing engine 1102a can cause the in-progress computation to be transferred to the neural network processing engine 1102b in the second neural network processor 1101b. For example, the neural network processing engine 1102a can instruct a DMA engine to copy the state 1108 of the computation to PCI controller 1144a, where the state 1108 can include intermediate results, among other things. In this example, the PCI controller 1144a can generate one or more writes to the second neural network processor 1101b, where the writes include the state 1108 values. In some implementations, the first neural network processor 1101a can write directly into the memory subsystem 1104b of the neural network processing engine 1102b. In some implementations, the state 1108 data is cached by the PCI controller 1144b in the second neural network processor 1101b. In these implementations, a DMA engine, for example, can move the state 1108 data from the PCI controller 1144b to the neural network processing engine 1102b.

Once the state 1108 has been loaded into the memory subsystem 1104b of the neural network processing engine 1102b in the second neural network processor 1101b, the neural network processing engine 1102b can resume the in-progress computation. In some examples, the first neural network processor 1101a triggers the second neural network processing engine 1102b by generating an interrupt to the second neural network processor 1101b or by writing a value to a register in the second neural network processor 1101b. Once the neural network processing engine 1102b has computed the final result, the second neural network processor 1101b can output the result.

In the example of FIG. 11, all of the weights 1106 for a neural network are stored local to a processing engine array 1010a-1010b, so that the neural network processors 1101a-1101b can avoid having to read processor memory to obtain the weights 1106. Some delay is incurred in transferring the state 1108 between the neural network processors 1101a-1101b, but the delay may still be much less than the delay caused by multiple reads to processor memory.

In various implementations, the examples illustrated in FIG. 10 and FIG. 11 can be combined in various ways. For example, processing a set of input data can begin in one neural network processing engine, and can be transferred to a second neural network processing engine in the same neural network processor. The in-progress computation can then be transferred from the second neural network processing engine to a third, where the third neural network processing engine is in a different neural network processor. Various configurations are possible to enable all the weights for a neural network to be stored on-chip, and for reads from processor memory to be minimized or eliminated.

Figure 12:
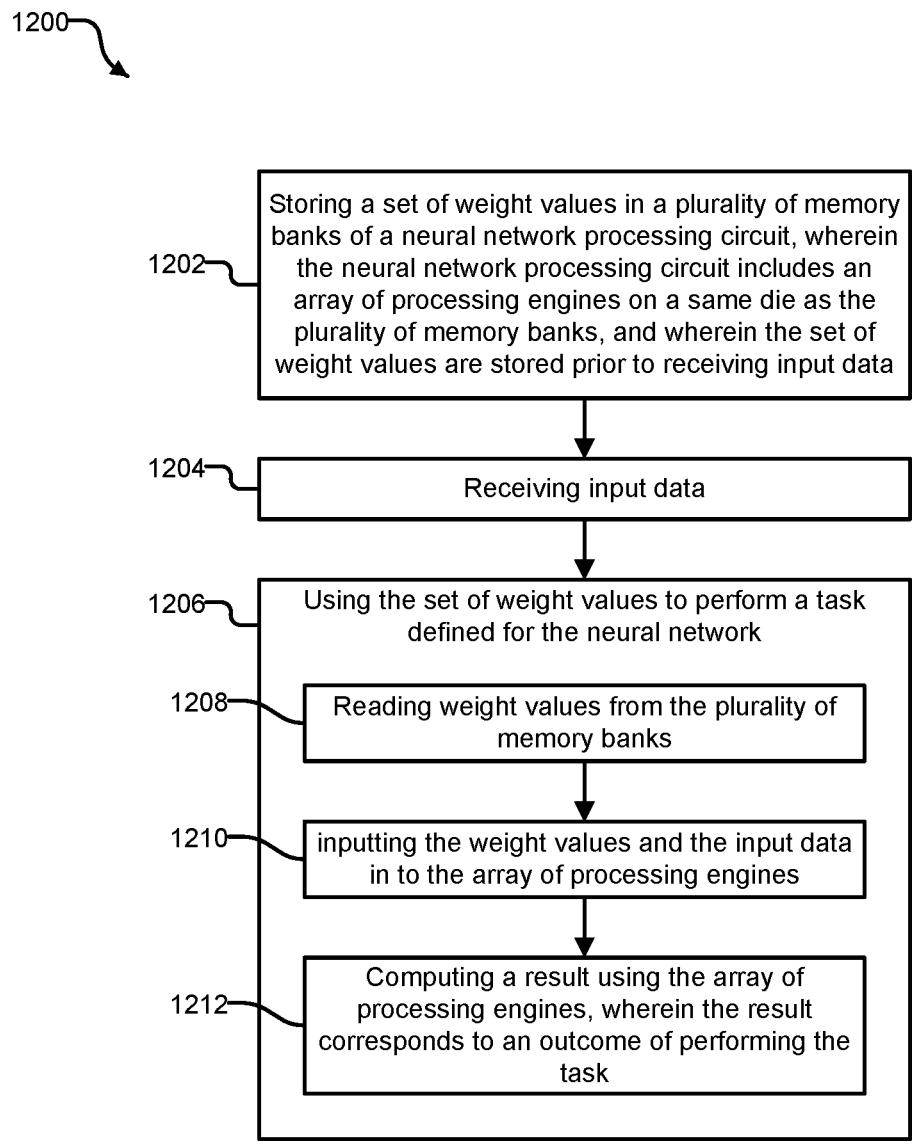
FIG. 12 illustrates an example of a process that can be executed by a neural network processor when the neural network processor is executing a neural network.

FIG. 12 illustrates an example of a process 1200 that can be executed by a neural network processor when the neural network processor is executing a neural network.

At step 1202 the process 1200 includes storing a set of weight values in a plurality of memory banks of a neural network processing circuit, wherein the neural network processing circuit includes an array of processing engines on a same die as the plurality of memory banks, and wherein the set of weight values are stored prior to receiving input data. In various implementations, the neural network processing circuit is part of a neural network processor. In some examples, the set weight values include all weight values for the neural network.

At step 1204, the process 1200 includes receiving input data. In various examples, the input data can be an image, an audio signal, a string of text, a sequence of numbers, or some other input.

At step 1206, the process 1200 includes using the set of weight values to perform a task defined for the neural network. The task can include, for example, image identification, speech recognition, natural language processing, game play, etc. The weight values can have been previously determined through training, in which, for example, input data whose output result is known was input into the neural network.

Step 1206 can include further steps for performing the task. At step 1208, performing the task includes reading weight values from the plurality of memory banks. In some examples, reading the weight values includes simultaneously reading a first weight value from a first memory bank from the plurality of memory banks and reading a second weight value from a second memory bank from the plurality of memory banks.

At step 1210, performing the task can further include inputting the weight values and the input data into the array of processing engines. In some examples, the array of processing engines is a systolic array. In some examples, step 1210 can further include determining, using the array of processing engines, an intermediate result, and storing the intermediate result in a memory bank from the plurality of memory banks. In some examples, the intermediate result can be written at the same time that additional weight values are read.

At step 1212, performing the task can further include computing a result using the array of processing engines, wherein the result corresponds to an outcome of performing the task.

In some implementations, the set of weight values stored in step 1202 include a first portion of all weight values for the neural network. In these implementations, the process 1200 can further include determining that the plurality of memory banks has available space. The available space may be from intermediate results requiring less memory space and/or from weight values that are no longer needed. The process 1200 can further include reading a second portion of all weight values for the neural network, wherein the second portion is read from an additional memory. In some examples, the additional memory can be associated with a second array of processing engines on the same die. In some examples, the additional memory can be off-chip. The process 1200 can further include writing the second portion to the available space. The second portion of weights can then be used to continue performing the task.

Figure 13:
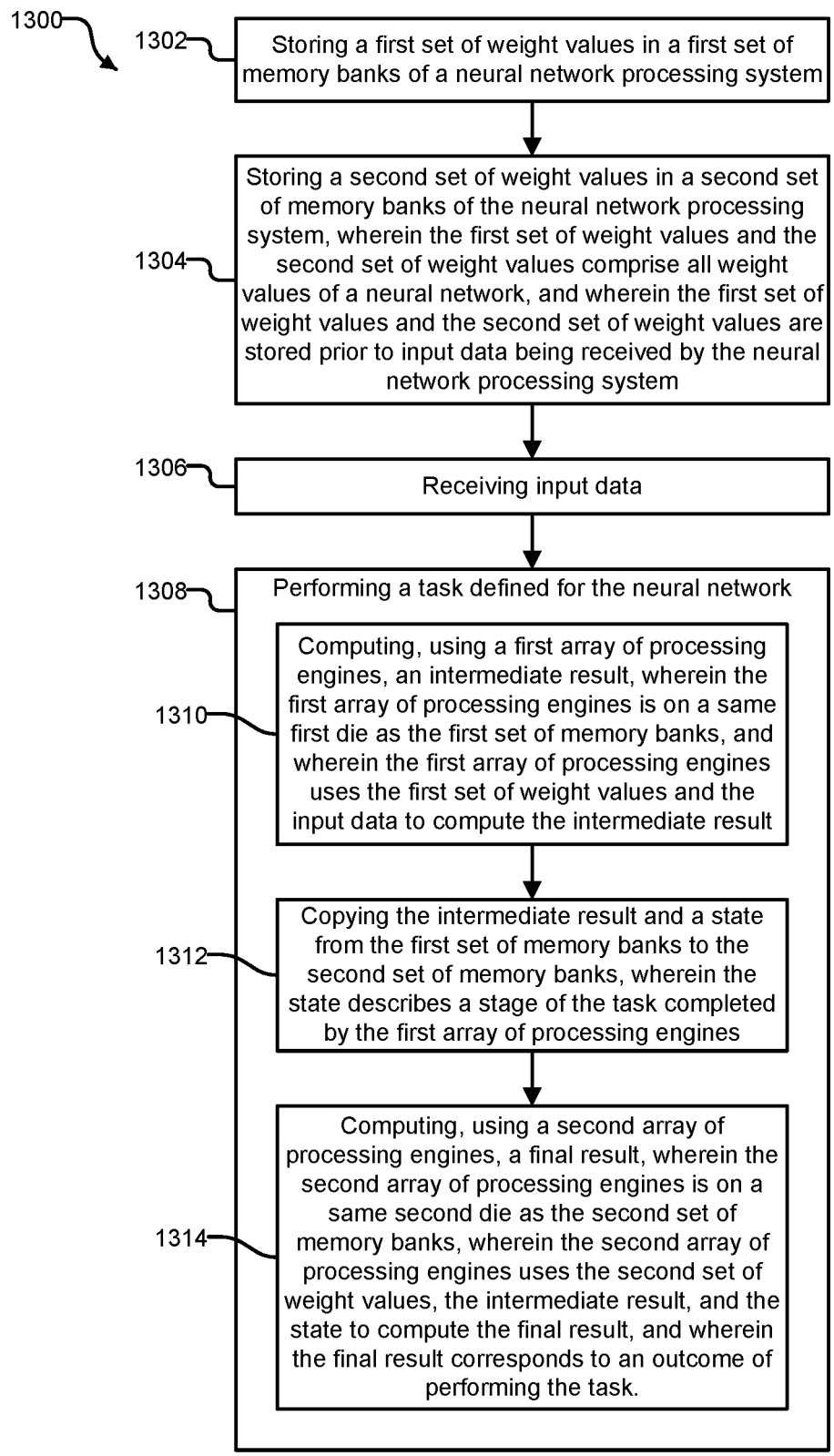
FIG. 13 illustrates an example of a process that can be executed by a neural network processor when the neural network processor is executing a neural network.

FIG. 13 illustrates an example of a process 1300 that can be executed by a neural network processor when the neural network processor is executing a neural network.

At step 1302, the process 1300 includes storing a first set of weight values in a first set of memory banks of a neural network processing system.

At step 1304, the process 1300 includes storing a second set of weight values in a second set of memory banks of the neural network processing system, wherein the first set of weight values and the second set of weight values comprise all weight values of a neural network, and wherein the first set of weight values and the second set of weight values are stored prior to input data being received by the neural network processing system.

At step 1306, the process 1300 includes receiving input data. In various examples, the input data can be an image, an audio signal, a string of text, a sequence of numbers, or some other input.

At step 1308, the process 1300 includes performing a task defined for the neural network. In various examples, the task correlates to a type of the input data (e.g. image recognition for an input image, speech recognition for an audio signal, etc.).

Step 1308 can include further steps for performing the task. At step 1310, performing the task includes computing, using a first array of processing engines, an intermediate result, wherein the first array of processing engines is on a same first die as the first set of memory banks, and wherein the first array of processing engines uses the first set of weight values and the input data to compute the intermediate result. Computing the intermediate result can include simultaneously reading two or more weight values from the first set of memory banks. In some examples, the intermediate result reflects the outputs of one or more initial layers of the neural network.

At step 1312, performing the task further includes copying the intermediate result and a state from the first set of memory banks to the second set of memory banks, wherein the state describes a stage of the task completed by the first array of processing engines. In some examples, when the intermediate result and the state are ready to be copied, the first array of processing has completed operations on the input data, and can begin operating on new input data.

At step 1314, performing the task further includes computing, using a second array of processing engines, a final result, wherein the second array of processing engines is on a same second die as the second set of memory banks, wherein the second array of processing engines uses the second set of weight values, the intermediate result, and the state to compute the final result, and wherein the final result corresponds to an outcome of performing the task. Computing the final result can include simultaneously reading two or more weight values from the second set of memory banks. In some examples, the final result reflects the outputs of one or more final layers of the neural network.

In some examples, the first die, containing the first set of memory banks and the first array of processing engines, and the second die, containing the second set of memory banks and the second array of processing engines, are portions of a same die. The die can be for a neural network processor, where the neural network processer includes more than one neural network processing engine (e.g., where a neural network processing engine includes a set of memory banks and an array of processing engines). In some examples, the neural network processor can include an internal communication fabric, over which the intermediate result and state can be copied.

In some examples, the first die and the second die are each part of a different neural network processor, and thus reside in different packages. In these examples, a host bus can enable the two neural network processors to intercommunicate, including to copy the intermediate result and state from one to the other.

As noted in step 1304, the first set of weight values and the second set of weight values can be all of the weight values for a neural network. This can mean that no weight values are read from a processor memory. The processor memory is in a different package than either the first die or the second die, and thus may have a significant read delay.

Figure 14:
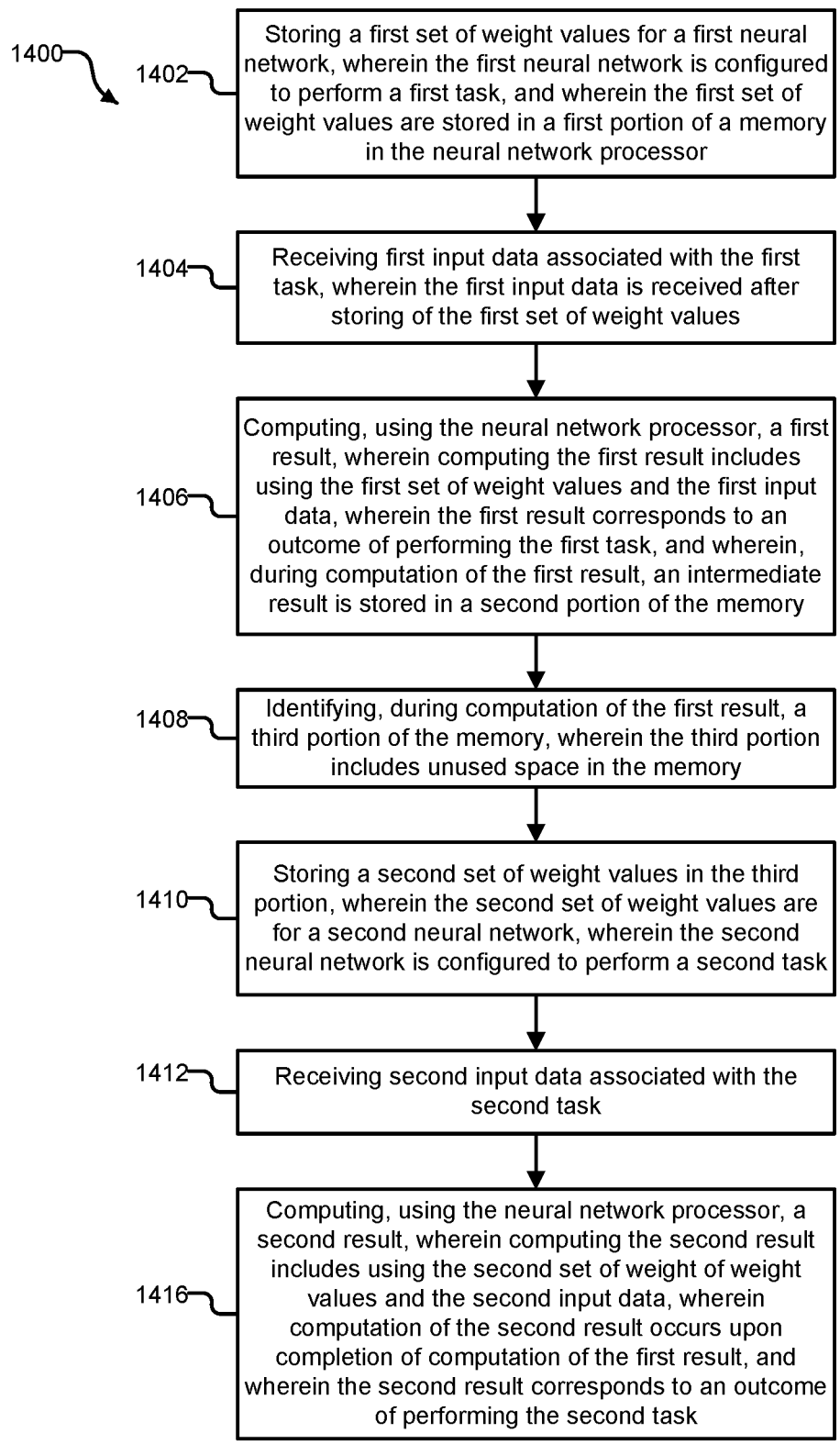
FIG. 14 illustrates an example of a process that can be executed by a computing system that includes a neural network processor.

FIG. 14 illustrates an example of a process 1400 that can be executed by a computing system that includes a neural network processor.

At step 1402, the process 1400 includes storing a first set of weight values for a first neural network, wherein the first neural network is configured to perform a first task, and wherein the first set of weight values are stored in a first portion of a memory in the neural network processor. The first set of weight values and the first task can be considered a first context.

At step 1404, the process 1400 includes receiving first input data associated with the first task, wherein the first input data is received after storing of the first set of weight values. The first task is to be performed using the first input data as input. In various implementations, the first set of weight values are stored in the memory in advance of any input data being received.

At step 1406, the process 1400 includes computing, using the neural network processor, a first result, wherein computing the first result includes using the first set of weight values and the first input data, wherein the first result corresponds to an outcome of performing the first task, and wherein, during computation of the first result, an intermediate result is stored in a second portion of the memory. The first portion and the second portion of the memory generally do not overlap.

At step 1408, the process 1400 includes identifying, during computation of the first result, a third portion of the memory, wherein the third portion includes unused space in the memory. The unused space can include space formerly, but no longer, part of the first portion (e.g., the portion used to store the first set of weight values) and/or space formerly and no longer part of the second portion (e.g., the portion used to store the intermediate result). The third portion generally does not overlap with the first portion or the second portion.

At step 1410, the process 1400 includes storing a second set of weight values in the third portion, wherein the second set of weight values are for a second neural network, wherein the second neural network is configured to perform a second task. In some cases, the second task is different from the first task. The second set of weight values can be stored before computation of the first result completes.

At step 1412, the process 1400 includes receiving second input data associated with the second task. The second task is to be performed using the second input data as an input.

At step 1414, the process 1400 includes computing, using the neural network processor, a second result, wherein computing the second result includes using the second set of weight of weight values and the second input data, wherein computation of the second result occurs upon completion of computation of the first result, and wherein the second result corresponds to an outcome of performing the second task.

In some implementations, the process 1400 can further include reducing a size of the first portion of the memory, wherein reduction in the size corresponds to weight values from the first set of weight values that are not needed to complete computation of the first result. The weight values that are not needed can include weight values that have already been used. Reducing the size of the first portion can include designating parts of the first portion as unused, and treating the unused parts as no longer part of the first portion.

In some implementations, the process 1400 can further include reducing a size of the second portion of the memory, wherein the size corresponds to an amount of memory needed to store the intermediate result. The amount of memory can decrease over the course of computing the first result. Reducing the size of the second portion can include designating parts of the second portion as no longer part of the second portion.

In some implementations, the first set of weight values includes fewer than all of the weight values for the first neural network. In these implementations, the process 1400 can further include reading an additional set of weight values for the first neural network from a second memory of the computing system. The second memory can be off-chip processor memory, an on-chip cache, and/or the memory of a second neural network processor. The process 1400 can further include storing the additional set of weight values in first portion of the memory, wherein the additional set of weight values are stored prior to storing the second set of weight values.

Figure 15:
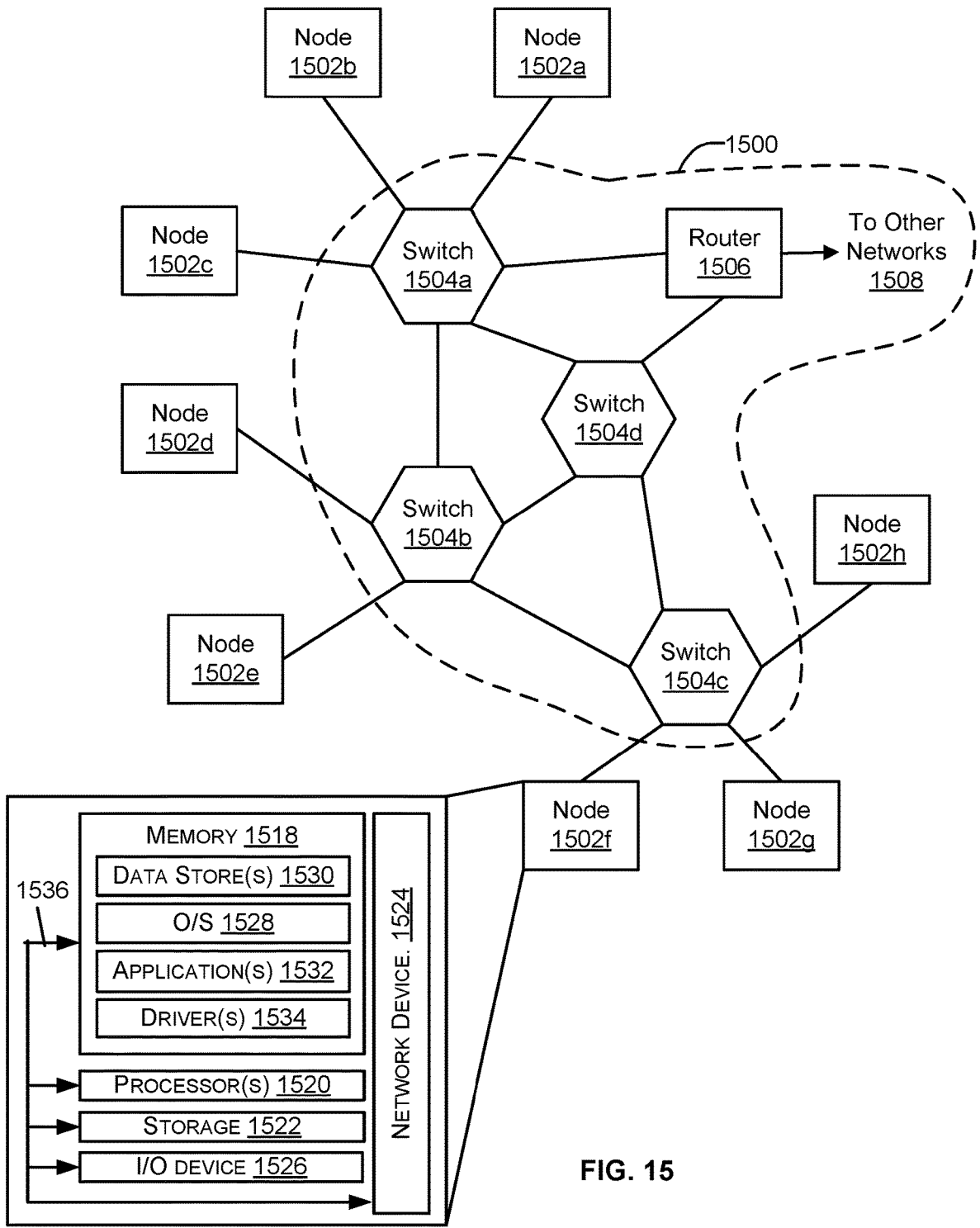
FIG. 15 illustrates a network in which the various examples discussed above can be used.

FIG. 15 illustrates a network 1500 in which the various examples discussed above can be used. The example network 1500 of FIG. 15 includes various different types of network devices, such as nodes comprising the network device, switches and routers. In certain examples, the network 1500 may be based on a switched architecture with point-to-point links. As illustrated in FIG. 15, the network 1500 includes a plurality of switches 1104a-1104d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1104a-1104d may be connected to a plurality of nodes 1102a-1102h and provide multiple paths between any two nodes.

The network 1500 may also include one or more network devices for connection with other networks 1508, such as other subnets, LANs, wide area networks (WANs), or the Internet, and may be referred to as routers 1506. Routers use headers and forwarding tables to determine the best path for forwarding the packets, and use protocols such as internet control message protocol (ICMP) to communicate with each other and configure the best route between any two devices.

In some examples, network(s) 1500 may include any one or a combination of many different types of networks, such as cable networks, the Internet, wireless networks, cellular networks and other private and/or public networks. Interconnected switches 1104a-1104d and router 1506, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers.

User devices may include computing devices to access an application 1532 (e.g., a web browser or mobile device application). In some aspects, the application 1532 may be hosted, managed, and/or provided by a computing resources service or service provider. The application 1532 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1508. Additionally, the user device(s) may be part of the distributed system managed by, controlled by, or otherwise part of the service provider computer(s) (e.g., a console device integrated with the service provider computers).

The node(s) 1102a-1102h of FIG. 15 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1532 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1518 and one or more processing units (or processor(s) 1520). The processor(s) 1520 may be implemented in hardware, computer-executable instructions, firmware, or combinations thereof. Computer-executable instruction or firmware implementations of the processor(s) 1520 may include computer-executable or machine-executable instructions written in any suitable programming language to perform the various functions described.

In some instances, the hardware processor(s) 1520 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1518 may store program instructions that are loadable and executable on the processor(s) 1520, as well as data generated during the execution of these programs. Depending on the configuration and type of the node(s) 1102a-1102h, the memory 1518 may be volatile (such as RAM) and/or non-volatile (such as ROM, flash memory, etc.). The memory 1518 may include an operating system 1528, one or more data stores 1530, one or more application programs 1532, one or more drivers 1534, and/or services for implementing the features disclosed herein.

The operating system 1528 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1528 may also be a proprietary operating system.

The data stores 1530 may include permanent or transitory data used and/or operated on by the operating system 1528, application programs 1532, or drivers 1534. Examples of such data include web pages, video data, audio data, images, user data, and so on. The information in the data stores 1530 may, in some implementations, be provided over the network(s) 1508 to the nodes 1102a-1102h. In some cases, the data stores 1530 may additionally or alternatively include stored application programs and/or drivers. Alternatively or additionally, the data stores 1530 may store standard and/or proprietary software libraries, and/or standard and/or proprietary application user interface (API) libraries. Information stored in the data stores 1530 may be machine-readable object code, source code, interpreted code, or intermediate code.

The drivers 1534 include programs that may provide communication between components in a node. For example, some drivers 1534 may provide communication between the operating system 1528 and additional storage 1522, network device 1524, and/or I/O device 1526. Alternatively or additionally, some drivers 1534 may provide communication between application programs 1532 and the operating system 1528, and/or application programs 1532 and peripheral devices accessible to the service provider computer. In many cases, the drivers 1534 may include drivers that provide well-understood functionality (e.g., printer drivers, display drivers, hard disk drivers, Solid State Device drivers). In other cases, the drivers 1534 may provide proprietary or specialized functionality.

The service provider computer(s) or servers may also include additional storage 1522, which may include removable storage and/or non-removable storage. The additional storage 1522 may include magnetic storage, optical disks, solid state disks, flash memory, and/or tape storage. The additional storage 1522 may be housed in the same chassis as the node(s) 1102a-1102h or may be in an external enclosure. The memory 1518 and/or additional storage 1522 and their associated computer-readable media may provide non-volatile storage of computer-readable instructions, data structures, program modules, and other data for the computing devices. In some implementations, the memory 1518 may include multiple different types of memory, such as SRAM, DRAM, or ROM.

The memory 1518 and the additional storage 1522, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1518 and the additional storage 1522 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1526, such as a keyboard, a mouse, a pen, a voice input device, a touch input device, a display, speakers, a printer, and the like. The node(s) 1102a-1102h may also include one or more communication channels 1536. A communication channel 1536 may provide a medium over which the various components of the node(s) 1102a-1102h can communicate. The communication channel or channels 1536 may take the form of a bus, a ring, a switching fabric, or a network.

The node(s) 1102a-1102h may also contain network device(s) 1524 that allow the node(s) 1102a-1102h to communicate with a stored database, another computing device or server, user terminals and/or other devices on the network(s) 1500.

In some implementations, the network device 1524 is a peripheral device, such as a PCI-based device. In these implementations, the network device 1524 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, a bus interface module may implement NVMe, and the network device 1524 may be connected to a computing system using a PCIe interface.

A PCI-based device may include one or more functions. A "function" describes operations that may be provided by the network device 1524. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1524 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

As part of a suite of capabilities, in various examples, one or more of the nodes 1102a-1102h can include a neural network processing engine and/or a neural network processor, various examples of which are discussed above. In these examples, the nodes 1102a-1102h equipped so equipped can be optimized for machine learning and neural network processing tasks.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 15, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
a first array of processing engines; and
a plurality of memory banks for storing a set of weight values for a neural network, wherein each memory bank from the plurality of memory banks is independently accessible, wherein the plurality of memory banks and the first array of processing engines are on a same die, and wherein the plurality of memory banks supports simultaneous accesses including reading a first value from a first memory bank, while a second value is being read from or written to a second memory bank;
wherein, upon receiving input data, the integrated circuit is configured to use the set of weight values to perform a task defined for the neural network, and wherein performing the task includes:
reading weight values from the plurality of memory banks;
inputting the weight values and the input data into the first array of processing engines; and
computing a result using the first array of processing engines, wherein the result corresponds to an outcome of performing the task.

2. The integrated circuit of claim 1, wherein each of the first and second values includes one of a weight value, an input value, or an intermediate result.

3. The integrated circuit of claim 1, further comprising:
a second array of processing engines, wherein a first set of memory banks from the plurality of memory banks is initially configured for use by the first array of processing engines, wherein a second set of memory banks from the plurality of memory banks is initially configured for use by the second array of processing engines, and wherein the first set of memory banks and the second set of memory banks each include a portion of the set of weight values.

4. The integrated circuit of claim 3, wherein performing the task further includes:
computing, by the first array of processing engines, an intermediate result, wherein the first array of processing engines computes the intermediate result using weight values from the first set of memory banks; and
reading, by the first array of processing engines, additional weight values from the second set of memory banks, wherein the first array of processing engines uses the intermediate result and the additional weight values to compute the result.

5. The integrated circuit of claim 3, wherein the set of weight values occupies less than all of the second set of memory banks, and wherein the second array of processing engines performs computations using a part of the second set of memory banks that is not occupied by the set of weight values.

6. The integrated circuit of claim 1, wherein performing the task further includes:
determining that an amount of memory needed for storing an intermediate result has decreased;
reading an additional set of weight values from another memory; and
storing the additional set of weight values in a portion of the plurality of memory banks that is no longer needed for the intermediate result.

7. The integrated circuit of claim 1, wherein the plurality of memory banks includes at least as many memory banks as a number of rows in the first array of processing engines.

8. The integrated circuit of claim 1, wherein the plurality of memory banks includes at least as many memory banks as a number of columns in the first array of processing engines.

9. The integrated circuit of claim 1, further comprising a pooling circuit to perform a pooling function on an output of the first array of processing engines to generate an intermediate result before writing the intermediate result to a portion of the plurality of memory banks.

10. The integrated circuit of claim 1, further comprising an activation circuit to perform an activation function on an output of the first array of processing engines to generate an intermediate result before writing the intermediate result to a portion of the plurality of memory banks.

11. A method comprising:
storing a set of weight values in a plurality of memory banks of a neural network processing circuit, wherein the neural network processing circuit includes an array of processing engines on a same die as the plurality of memory banks, wherein the plurality of memory banks supports simultaneous accesses including reading a first value from a first memory bank, while a second value is being read from or written to a second memory bank, and wherein the set of weight values is stored prior to receiving input data;
receiving input data; and
using the set of weight values to perform a task defined for a neural network, wherein performing the task includes:
reading weight values from the plurality of memory banks;
inputting the weight values and the input data into the array of processing engines; and
computing a result using the array of processing engines, wherein the result corresponds to an outcome of performing the task.

12. The method of claim 11, wherein each of the first and second values includes one of a weight value, an input value, or an intermediate result.

13. The method of claim 11, wherein performing the task further includes:
computing, by the array of processing engines, an intermediate result, wherein the array of processing engines computes the intermediate result using weight values from a first set of memory banks in the plurality of memory banks.

14. The method of claim 13, wherein performing the task further includes:
writing the intermediate result to a first portion of the plurality of memory banks, and moving the intermediate result to a second portion of the plurality of memory banks from which the intermediate result is read.

15. The method of claim 13, wherein performing the task further includes:
reading, by the array of processing engines, additional weight values from a second set of memory banks in the plurality of memory banks, wherein the array of processing engines uses the intermediate result and the additional weight values to compute the result.

16. The method of claim 15, wherein a second array of processing engines performs computations using a part of the second set of memory banks that is not occupied by the set of weight values.

17. The method of claim 11, wherein performing the task further includes:
determining that an amount of memory needed for storing an intermediate result has decreased;
reading an additional set of weight values from another memory; and
storing the additional set of weight values in a portion of the plurality of memory banks that is no longer needed for the intermediate result.

18. The method of claim 11, wherein each row of the array of processing engines reads from a respective memory bank of the plurality of memory banks.

19. The method of claim 11, wherein each column of the array of processing engines writes to a respective memory bank of the plurality of memory banks.

20. The method of claim 11, further performing an activation function or a pooling function on an output of the array of processing engines to generate an intermediate result before writing the result to a portion of the plurality of memory banks.

* * * * *